United States Patent
Aitcin et al.

(10) Patent No.: US 11,124,271 B2
(45) Date of Patent: Sep. 21, 2021

(54) SNOWMOBILE HAVING AN AIR-COOLED CONTINUOUSLY VARIABLE TRANSMISSION

(71) Applicant: BOMBARDIER RECREATIONAL PRODUCTS INC., Valcourt (CA)

(72) Inventors: Xavier-Pierre Aitcin, St-Hyacinthe (CA); Frederic Desjardins, Orford (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 0 days.

(21) Appl. No.: 16/954,391

(22) PCT Filed: Dec. 21, 2018

(86) PCT No.: PCT/IB2018/060549
§ 371 (c)(1),
(2) Date: Jun. 16, 2020

(87) PCT Pub. No.: WO2019/123432
PCT Pub. Date: Jun. 27, 2019

(65) Prior Publication Data
US 2021/0086869 A1    Mar. 25, 2021

Related U.S. Application Data

(60) Provisional application No. 62/609,846, filed on Dec. 22, 2017.

(51) Int. Cl.
*B62M 27/02* (2006.01)
*B62M 9/08* (2006.01)
(Continued)

(52) U.S. Cl.
CPC .............. *B62M 27/02* (2013.01); *B62M 9/08* (2013.01); *F16H 9/16* (2013.01); *F16H 55/56* (2013.01);
(Continued)

(58) Field of Classification Search
CPC ............ B62M 27/02; B62M 2027/023; B62M 2027/027; F16H 9/16; F16H 57/0489;
(Continued)

(56) References Cited

U.S. PATENT DOCUMENTS 4,596,537 A * 6/1986 Te-Long ................... F16H 9/12
474/93
5,976,044 A * 11/1999 Kuyama ................. F02B 61/02
474/146
(Continued)

OTHER PUBLICATIONS

International Search Report of PCT/IB2018/060549; Blaine R. Copenheaver; dated Jun. 5, 2019.

*Primary Examiner* — Anne Marie M Boehler
(74) *Attorney, Agent, or Firm* — BCF LLP

(57) ABSTRACT

A snowmobile includes a frame, a tunnel, a seat, an endless track, at least one ski, a handlebar, a cowling defining an engine compartment, an engine, a continuously variable transmission (CVT) operatively connecting the engine to the endless track, and a pulley guard assembly disposed over at least a portion of the CVT. The CVT includes a primary pulley, a secondary pulley, and an endless flexible member operatively connecting the primary pulley to the secondary pulley. The pulley guard assembly is disposed between the CVT and a lateral side of the cowling, and defines an air inlet. The air inlet fluidly communicates with a space defined between the pulley guard assembly and the lateral side. In some implementations, the cowling defines an air inlet. In some implementations, an air duct fluidly connects the air
(Continued)

inlet of the cowling to the air inlet of the pulley guard assembly.

18 Claims, 22 Drawing Sheets

(51) Int. Cl.
*F16H 9/16* (2006.01)
*F16H 57/027* (2012.01)
*F16H 57/035* (2012.01)
*F16H 57/04* (2010.01)
*F16H 55/56* (2006.01)

(52) U.S. Cl.
CPC ......... *F16H 57/027* (2013.01); *F16H 57/035* (2013.01); *F16H 57/0416* (2013.01); *F16H 57/0489* (2013.01); *B62M 2027/023* (2013.01); *B62M 2027/025* (2013.01); *B62M 2027/027* (2013.01); *B62M 2027/028* (2013.01)

(58) Field of Classification Search
CPC .... F16H 57/0416; F16H 57/027; B62J 13/00; B62J 13/02; B62J 13/04; B62J 13/06
See application file for complete search history.

(56) References Cited

U.S. PATENT DOCUMENTS

| | | | |
|---|---|---|---|
| 7,617,899 B1* | 11/2009 | Warner | B62M 27/02 180/190 |
| 8,776,930 B2* | 7/2014 | Tadych | F16H 57/0416 180/182 |
| 9,016,420 B1* | 4/2015 | Gauthier | B62M 27/02 180/190 |
| 9,453,573 B2 | 9/2016 | Renner et al. | |
| 10,648,554 B2* | 5/2020 | Kuhl | F16H 57/0416 |
| 2004/0224806 A1* | 11/2004 | Chonan | F16H 57/0415 474/93 |
| 2004/0259673 A1 | 12/2004 | Bertrand et al. | |
| 2005/0205318 A1 | 9/2005 | Abe et al. | |
| 2009/0298627 A1* | 12/2009 | Johnson | F16H 55/56 474/93 |
| 2010/0071981 A1 | 3/2010 | Nakamura et al. | |
| 2010/0288572 A1* | 11/2010 | Maltais | B62D 55/06 180/190 |
| 2011/0240398 A1 | 10/2011 | Vezina | |
| 2013/0090199 A1* | 4/2013 | Itoo | F16H 57/0416 474/93 |
| 2015/0377341 A1* | 12/2015 | Renner | F16H 57/027 474/93 |
| 2016/0059929 A1 | 3/2016 | Pard et al. | |
| 2017/0268655 A1 | 9/2017 | Stocks et al. | |
| 2019/0285160 A1* | 9/2019 | Nelson | F16H 57/0416 |

* cited by examiner

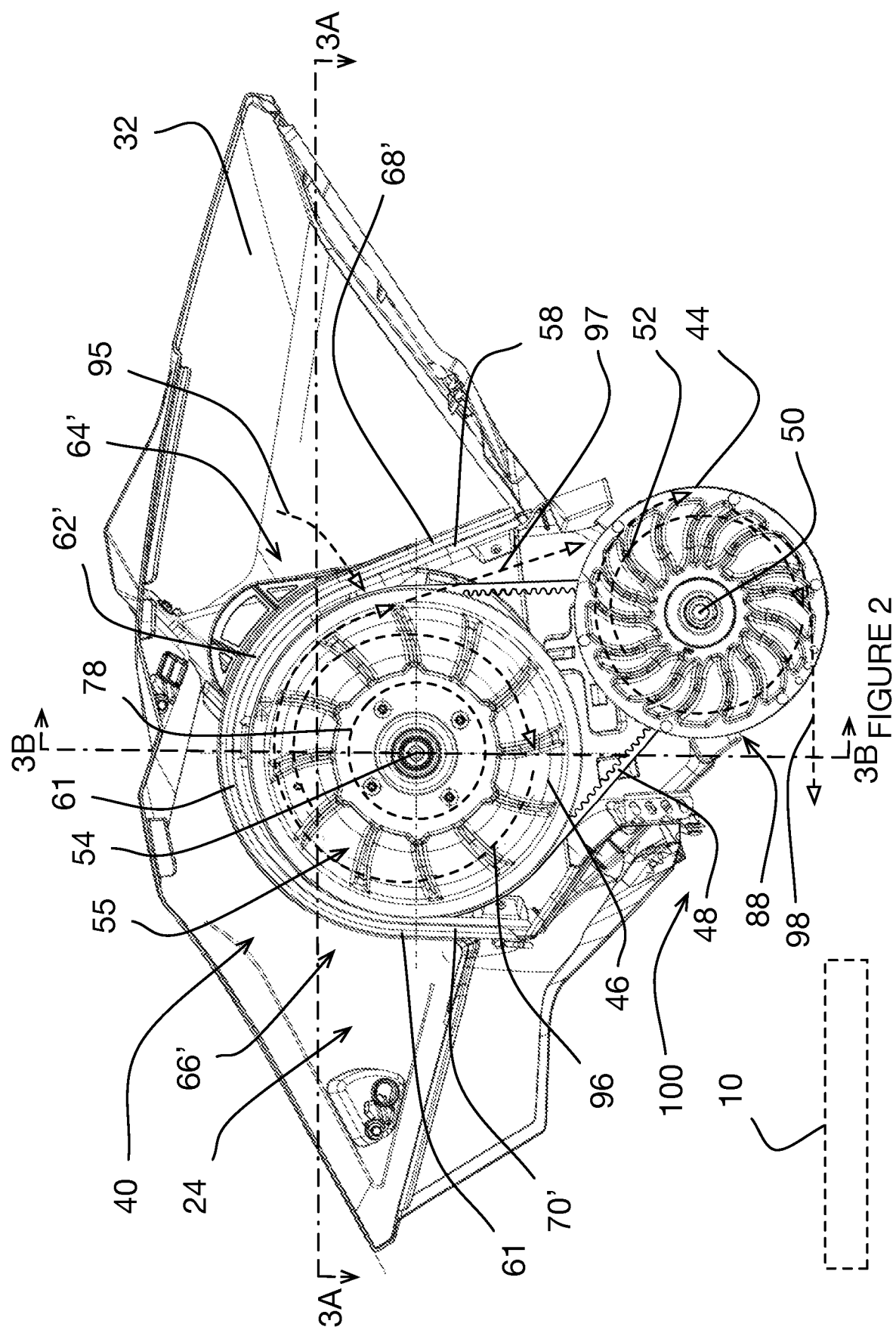

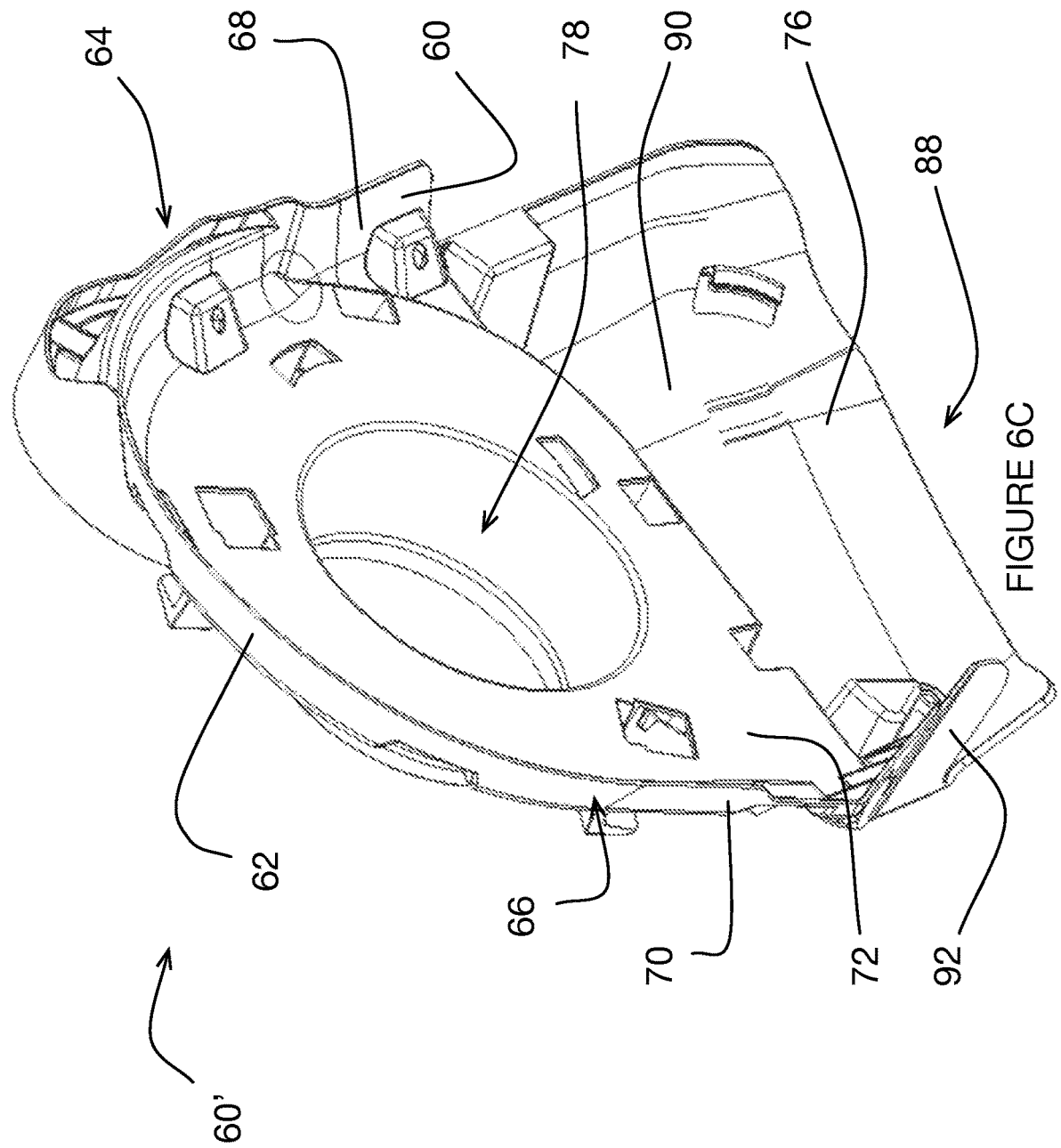

SNOWMOBILE HAVING AN AIR-COOLED CONTINUOUSLY VARIABLE TRANSMISSION

CROSS-REFERENCE

The present application claims priority to U.S. Provisional Patent Application No. 62/609,846, entitled "Snowmobile having an Air-Cooled Continuously Variable Transmission", filed Dec. 22, 2017, the entirety of which is incorporated herein by reference.

TECHNICAL FIELD

The present technology relates to snowmobiles having a continuously variable transmission.

BACKGROUND

Snowmobiles are often equipped with a continuously variable transmission (CVT) for transferring motive power from the engine to the track for propelling the snowmobiles. Snowmobile CVTs are covered by cowlings and are protected from snow and water during use of the snowmobile. As power generated by an engine of a snowmobile is delivered to the snowmobile's CVT, friction between the CVT belt and the pulleys of the CVT generates heat. The rotating drive and driven pulleys of the CVT generate a flow of air that circulates around the CVT's components inside the cowlings and helps remove heat from the CVT's components. However, as power generated by the engine increases, so does the heat generated by the CVT and the heat given off by the engine, resulting in air around the CVT being warmer. Excessive heat may negatively affect the CVT's components, and especially the CVT belt. The CVT belt may deteriorate at a faster rate as the temperature around it increases.

Therefore, there is a desire to cool snowmobile CVTs.

SUMMARY

It is an object of the present technology to ameliorate at least some of the inconveniences present in the prior art.

According to one aspect of the present technology, there is provided a snowmobile, that includes a frame, the frame including a tunnel; a seat disposed on the tunnel; an endless track disposed at least in part under the tunnel; at least one ski operatively connected to the frame; a handlebar operatively connected to the at least one ski; a cowling connected to the frame, the cowling being disposed at least in part forward of the seat, the cowling defining at least in part an engine compartment; an engine disposed at least in part in the engine compartment and being connected to the frame; a continuously variable transmission (CVT) operatively connecting the engine to the endless track, the CVT being disposed at least in part in the engine compartment, the CVT being disposed laterally between the engine and a lateral side of the cowling; and a pulley guard assembly disposed over at least a portion of the CVT, the pulley guard assembly being disposed at least in part laterally between the CVT and the lateral side of the cowling, the pulley guard assembly defining a pulley guard assembly air inlet, the pulley guard assembly air inlet fluidly communicating with a space defined at least in part laterally between the pulley guard assembly and the lateral side of the cowling.

In some implementations, the CVT includes a primary pulley operatively connected to the engine, the primary pulley being driven by the engine about a primary pulley axis; a secondary pulley operatively connecting the primary pulley to the endless track, the secondary pulley being driven by the primary pulley about a secondary pulley axis, the secondary pulley axis being parallel to the primary pulley axis; and an endless flexible member operatively connecting the primary pulley to the secondary pulley.

In some implementations, a cowling air inlet is defined in the cowling, the cowling air inlet fluidly communicating with the space.

In some implementations, the pulley guard assembly defines a pulley guard assembly air outlet, the pulley guard assembly air outlet fluidly communicating with the pulley guard assembly air inlet via an airflow path defined through the pulley guard assembly.

In some implementations, the cowling defines a cowling air outlet, the cowling air outlet fluidly communicating with the space.

In some implementations, the cowling air outlet is defined in a lower end of the cowling.

In some implementations, the snowmobile further includes a left side footrest connected to a left side of the tunnel and a right side footrest connected to a right side of the tunnel, and the cowling air outlet directs air from the space toward one of the left side footrest and the right side footrest.

In some implementations, the cowling air outlet is disposed in front of the one of the left side footrest and the right side footrest.

In some implementations, the primary pulley includes a first plurality of fins.

In some implementations, the secondary pulley includes a second plurality of fins.

In some implementations, the cowling includes a hood, a left side panel, a right side panel, and a bottom pan; and the hood, the left side panel, the right side panel, and the bottom pan define at least in part the engine compartment.

In some implementations, the pulley guard assembly is disposed over at least part of the secondary pulley and at least part of the endless flexible member.

In some implementations, the pulley guard assembly air inlet faces toward the lateral side of the cowling.

In some implementations, the pulley guard assembly air inlet is coaxial with the secondary pulley axis.

In some implementations, a cowling air inlet and a cowling air outlet are defined in the cowling, the cowling air inlet and the cowling air outlet fluidly communicating with the space; and the pulley guard assembly defines a pulley guard assembly air outlet, the pulley guard assembly air outlet fluidly communicating with the pulley guard assembly air inlet via an airflow path defined through the pulley guard assembly.

According to another aspect of the present technology, there is provided a snowmobile having a frame, the frame including a tunnel; a seat disposed on the tunnel; an endless track disposed at least in part under the tunnel; at least one ski operatively connected to the frame; a handlebar operatively connected to the at least one ski; a cowling connected to the frame, the cowling being disposed at least in part forward of the seat, the cowling defining at least in part an engine compartment and a cowling air inlet; an engine disposed at least in part in the engine compartment and being connected to the frame; a continuously variable transmission (CVT) operatively connecting the engine to the endless track, the CVT being disposed at least in part in the engine compartment, the CVT being disposed laterally between the engine and a lateral side of the cowling; a pulley guard assembly disposed over at least a portion of the CVT, the pulley guard assembly being disposed at least in part laterally between the CVT and the lateral side of the cowling, the pulley guard assembly defining a pulley guard assembly air inlet; and an air duct fluidly connecting the cowling air inlet to the pulley guard assembly air inlet.

In some implementations, the CVT includes a primary pulley operatively connected to the engine, the primary pulley being driven by the engine about a primary pulley axis; a secondary pulley operatively connecting the primary pulley to the endless track, the secondary pulley being driven by the primary pulley about a secondary pulley axis, the secondary pulley axis being parallel to the primary pulley axis; and an endless flexible member operatively connecting the primary pulley to the secondary pulley.

In some implementations, the air duct has a first end attached to the cowling at the cowling air inlet to receive an airflow via the cowling air inlet; and a second end positioned proximate the pulley guard assembly air inlet to supply the airflow to the pulley guard assembly air inlet.

In some implementations, a seal is positioned between the second end of the air duct and the pulley guard assembly, the seal circumscribing the pulley guard assembly air inlet.

In some implementations, the seal is a foam seal that is attached to the pulley guard assembly and lacks attachment to the second end of the air duct.

In some implementations, the pulley guard assembly defines a pulley guard assembly air outlet, the pulley guard assembly air outlet fluidly communicating with the pulley guard assembly air inlet via an airflow path defined through the pulley guard assembly.

In some implementations, a space is defined at least in part laterally between the pulley guard assembly and the lateral side of the cowling; and the cowling defines a cowling air outlet, the cowling air outlet fluidly communicating with the space.

In some implementations, the snowmobile further includes a left side footrest connected to a left side of the tunnel and a right side footrest connected to a right side of the tunnel; and the cowling air outlet directs air from the space toward one of the left side footrest and the right side footrest.

In some implementations, the cowling air outlet is disposed in front of the one of the left side footrest and the right side footrest.

In some implementations, the primary pulley includes a first plurality of fins.

In some implementations, the secondary pulley includes a second plurality of fins.

In some implementations, the cowling includes a hood, a left side panel, a right side panel, and a bottom pan; and the hood, the left side panel, the right side panel, and the bottom pan define at least in part the engine compartment.

In some implementations, the cowling air inlet is defined in one of the left side panel and the right side panel; and the one of the left side panel and the right side panel is pivotable between a closed position in which the second end of the air duct is positioned proximate the pulley guard assembly air inlet, and an open position in which the second end of the air duct is spaced from the pulley guard assembly air inlet to provide service access to the pulley guard assembly air inlet.

In some implementations, the pulley guard assembly is disposed over at least part of the secondary pulley and at least part of the endless flexible member.

In some implementations, the pulley guard assembly air inlet faces toward the lateral side of the cowling.

In some implementations, the pulley guard assembly air inlet is coaxial with the secondary pulley axis.

In some implementations, the secondary pulley axis passes through the pulley guard assembly air inlet.

In some implementations, the pulley guard assembly air inlet has a shape that is one of circular and elliptical, the shape having a center; and the secondary pulley axis passes through the center of the pulley guard assembly air inlet.

In some implementations, the pulley guard assembly defines the pulley guard assembly air outlet in a bottom of the pulley guard assembly.

According to another aspect of the present technology, there is provided a pulley guard assembly for a continuously variable transmission (CVT), the pulley guard assembly having an arcuate top wall having a front end and a rear end; a front wall extending downward from the front end of the arcuate top wall; a rear wall extending downward from the rear end of the arcuate top wall; and a side wall connected to one side of the arcuate top wall, the front wall and the rear wall, the side wall defining an air inlet.

In some implementations, the pulley guard assembly is open on a side thereof opposite the side wall and at a bottom thereof.

In some implementations, the front wall extends downward and forward from the front end of the arcuate top wall.

In some implementations, the rear wall extends downward and forward from the rear end of the arcuate top wall.

In some implementations, the front wall and the rear wall diverge from each other as they extend downward from the arcuate top wall.

In some implementations, an axis of curvature of the top wall passes through a center of the air inlet.

In some implementations, the pulley guard assembly further comprises a flange connected to the side wall about the air inlet, the side wall being disposed laterally between the flange and the top, front and rear walls.

In some implementations, the pulley guard assembly further includes a seal connected to a surface of the side wall, the surface being opposite the arcuate top wall, the front wall and the rear wall, the seal circumscribing the air inlet.

In some implementations, the pulley guard assembly further includes a seal connected to a free end of the flange, the seal circumscribing the air inlet.

In some implementations, the seal is a foam seal.

For purposes of this application, terms related to spatial orientation such as forward, rearward, upward, downward, left, and right, are as they would normally be understood by a driver of a vehicle sitting on the driver seat of the vehicle in a normal riding position. Terms related to spatial orientation when describing or referring to components or subassemblies of the vehicle and of various components for the vehicle, separately from the vehicle should be understood as they would be understood when these components or subassemblies are mounted to the vehicle, unless specified otherwise in this application.

For the purposes of this document, the term "service access" means an access for a person to service and/or replace one or more components for which the service access is provided.

For the purposes of this document, the term "ambient air" means air that is outside of a snowmobile.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 is a right side elevation view of CVT pulleys, a pulley guard assembly and a left side panel of the snowmobile of FIG. 1A;

FIG. 6C is a perspective view taken from a rear, top, right side of the side cover of the pulley guard assembly and the second side wall of FIG. 6B;

DETAILED DESCRIPTION

Figure 1A:
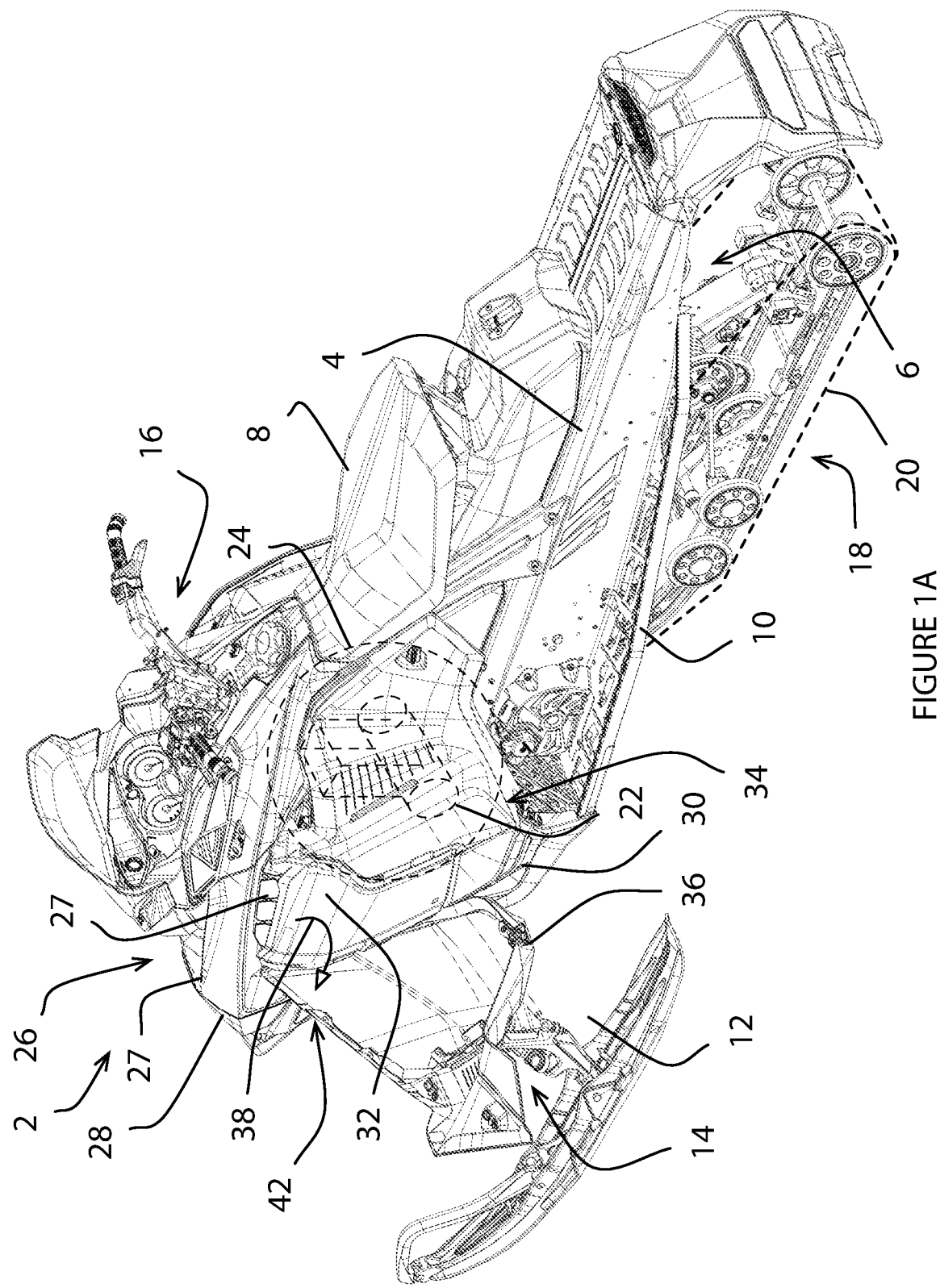
FIG. 1A is a perspective view taken from a rear, left, top side of a snowmobile.

FIG. 1A shows a first implementation of a snowmobile 2. The snowmobile 2 has a frame 4. The frame 4 includes a tunnel 6. A seat 8 is disposed on the tunnel 6. A left side footrest 10 extends leftward from the tunnel 6 on a left side of the tunnel 6. A right side footrest extends rightward from the tunnel 6 on a right side of the tunnel 6. In the present implementation, the footrests are connected to the tunnel 6. In the present implementation, the right side footrest is a mirror image of the left side footrest 10, and is therefore not shown in the figures. It is contemplated that any other foot support(s) could be used, including foot pegs instead of or in addition to the footrests.

The snowmobile 2 further includes a front left ski 12 and a front right ski supported by the frame 4 via front suspension systems 14. In the present implementation, the front right ski is a mirror image of the front left ski 12, and the front right suspension system is a mirror image of the front left suspension system 14. It is contemplated that the snowmobile 2 could have a single ski instead of two skis 12.

The snowmobile 2 further includes a handlebar 16 supported by the frame 4. The handlebar 16 is operatively connected to the front left ski 12 and the front right ski and is operable by a driver of the snowmobile 2 to steer the front left ski 12 and the front right ski to steer the snowmobile 2.

Figure 1B:
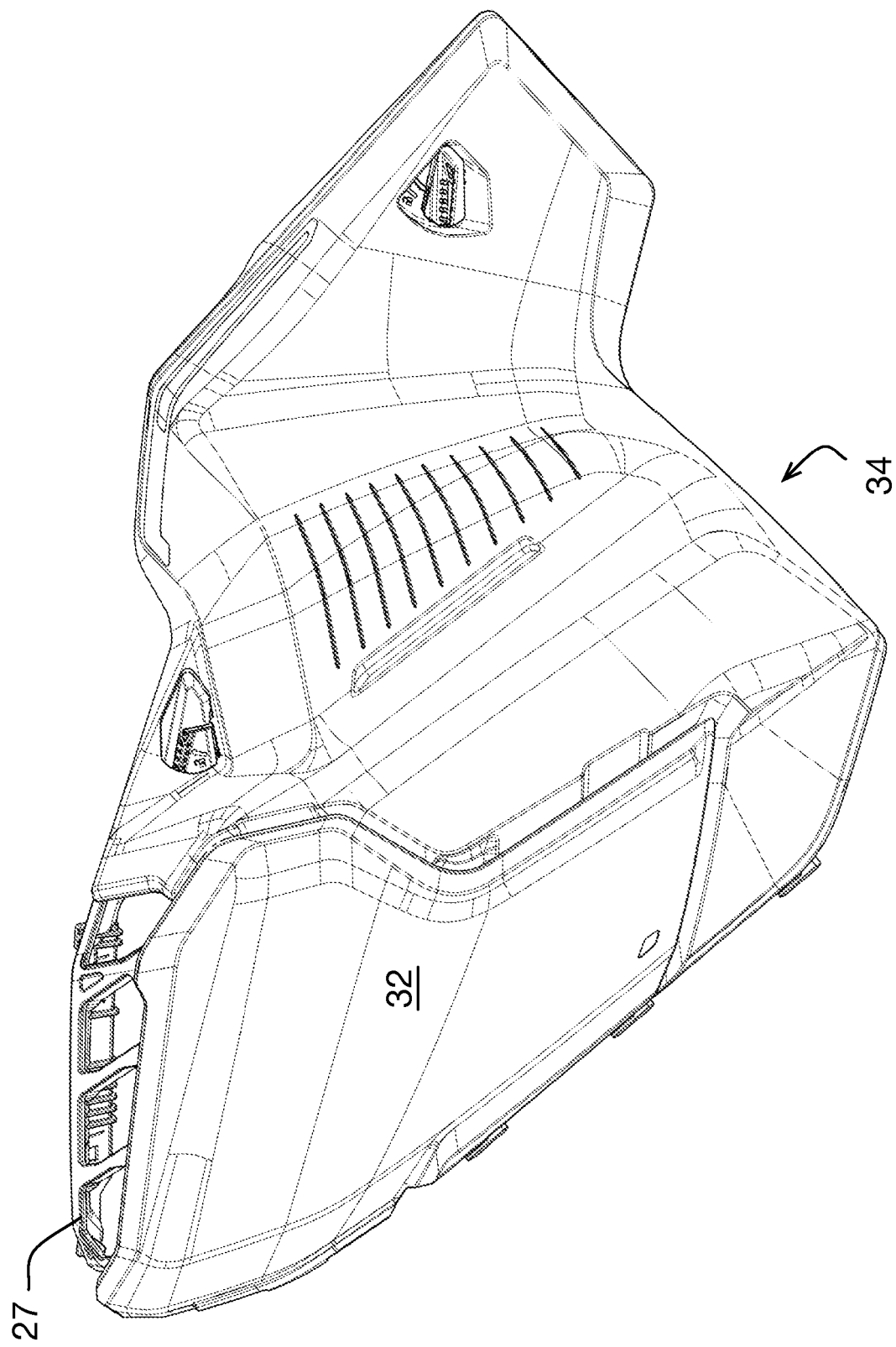
FIG. 1B is a perspective view taken from a rear, left, top side of a left side panel of the snowmobile of FIG. 1A.
Figure 1C:
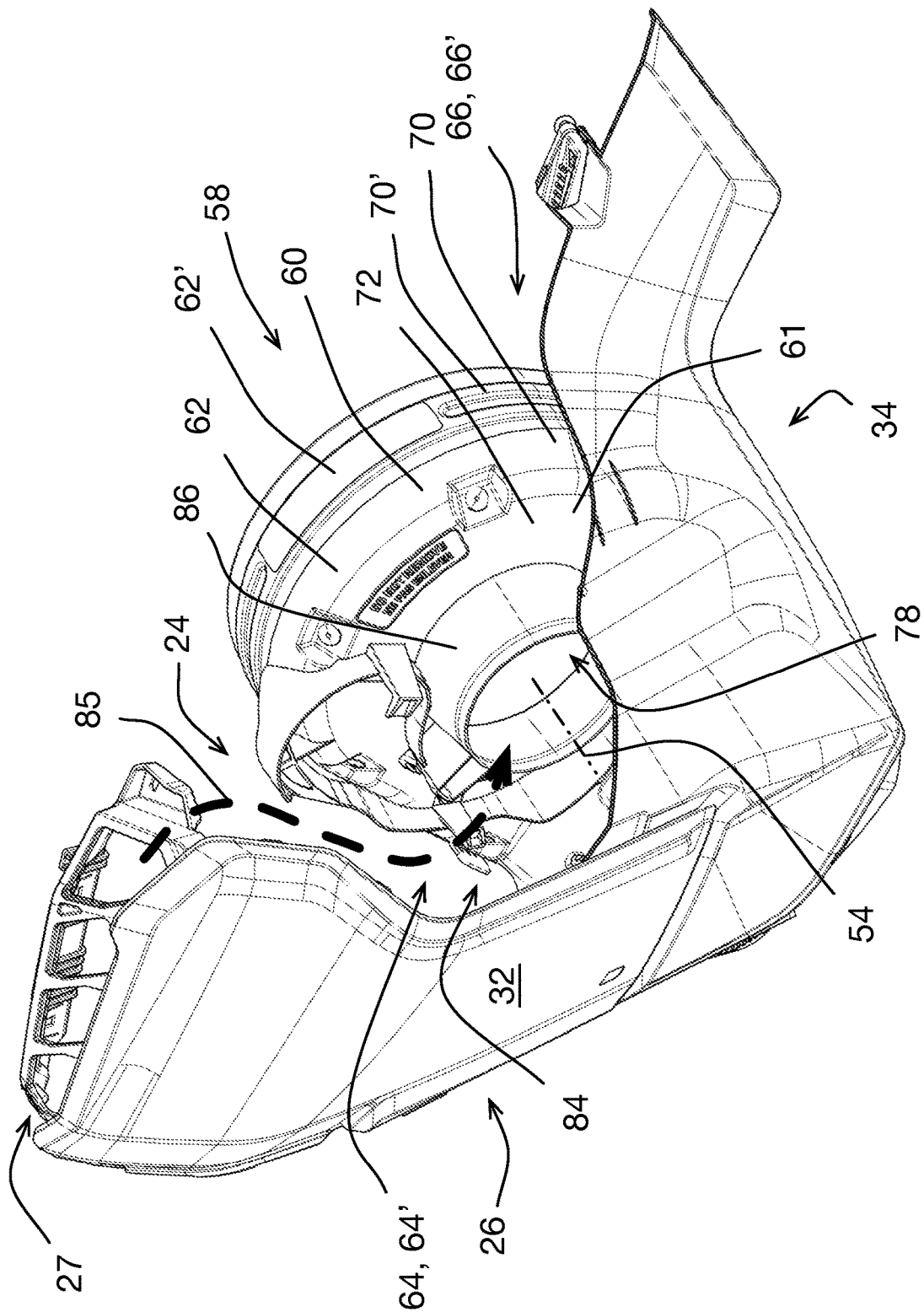
FIG. 1C is a perspective view taken from a rear, left, top side of the left side panel of FIG. 1B, with the left side panel being partially cut away to show some components of the snowmobile.

The snowmobile 2 further includes a rear suspension system 18 connected to the frame 4. An endless track 20, shown schematically in phantom in FIG. 1A, is mounted onto the rear suspension system 18 and disposed under the tunnel 6. In the present implementation, the endless track 20 is powered by an internal combustion engine 22 (shown schematically in FIGS. 1 and 7) that is connected to the frame 4.

In the present implementation, the engine 22 is disposed inside an engine compartment 24 defined by a cowlings 26 of the snowmobile 2. It is contemplated that the cowlings 26 and other parts of the snowmobile 2, such as the frame 4, could collectively define the engine compartment 24.

In the present implementation, the cowlings 26 are disposed in part forward of the seat 8, and includes a hood 28, a bottom pan 30, a left side panel 32 and a right side panel, all of which are supported by the frame 4.

The left side panel 32 is positioned on a left side of the engine 22. The left side panel 32 is pivotably supported on the frame 4 of the snowmobile 2 via a conventionally known set of hinges and is pivotable between a closed position 34 in which the left side panel 32 shields the engine 22 on a left side of the snowmobile 2, and an open position 36 which is leftward and forward, about the hinges, from the closed position 34 of the left side panel 32. In the open position 36, the left side panel 32 provides service access to the engine 22 and other components in the engine compartment 24. The left side panel 32 is in the closed position 34 in FIG. 1A. The open position 36 is also shown in FIG. 1A. The pivoting movement of the left side panel 32 from the closed position 34 to the open position 36 is shown schematically with reference arrow 38.

The right side panel is positioned on a right side of the engine 22 and shields the engine 22 on the right side of the snowmobile 2. The right side panel is substantially a mirror image of the left side panel 32 and is therefore not shown in the figures. Similar to the left side panel 32, the right side panel is openable to provide service access to the engine 22. It is contemplated that a different number and configuration of panels could be used. It is also contemplated that the cowlings 26 could include any other suitable combination of elements, depending on the application of the snowmobile 2 for example.

With reference to FIG. 2, the snowmobile 2 further includes a CVT 40 that operatively connects the engine 22 to the endless track 20 to propel the snowmobile 2. In the present implementation, the CVT 40 is disposed in part in the engine compartment 24 and laterally between the engine 22 and a lateral left side 42 of the cowlings 26. In some implementations, the CVT 40 is disposed entirely in the engine compartment 24. As best shown in FIG. 2, the CVT 40 includes a primary pulley 44, a secondary pulley 46, and an endless flexible member 48.

The primary pulley 44 is operatively connected to the engine 22 to be driven by the engine 22 about a primary pulley axis 50. As shown, the primary pulley 44 has a plurality of fins 52 that help induce an airflow when the primary pulley 44 is driven by the engine 22 about the primary pulley axis 50.

In the present implementation, the fins 52 are positioned on a right side surface of the primary pulley 44, radially about the primary pulley axis 50. It is contemplated that the fins 52 could have a different shape, arrangement and placement. It is also contemplated that the primary pulley 44 could not have fins.

Still referring to FIG. 2, the endless flexible member 48 connects the primary pulley 44 to the secondary pulley 46 to drive the secondary pulley 46 about a secondary pulley axis 54. The secondary pulley axis 54 is parallel to the primary pulley axis 50. As shown, in the present implementation, the secondary pulley axis 54 is rearward and upward from the primary pulley axis 50. In the present implementation, the endless flexible member 48 is a rubber CVT belt 48.

In the present implementation, the secondary pulley 46 is operatively connected to the endless track 20 to drive the endless track 20 to propel the snowmobile 2.

As shown in FIG. 2, the secondary pulley 46 has a plurality of fins 55 positioned on a right side of the secondary pulley 46, radially about the secondary pulley axis 54. As shown in FIG. 3C, the secondary pulley 46 also has a plurality of fins 56 positioned on a left side of the secondary pulley 46, radially about the secondary pulley axis 54. As described in more detail herein below, the fins 55, 56 help induce an airflow when the secondary pulley 46 is driven by the engine 22 about the secondary pulley axis 54. It is contemplated that the fins 55, 56 could have a different shape, arrangement and placement. It is contemplated that the secondary pulley 46 could have only the fins 55 on the right side thereof, or only the fins 56 on the left side thereof, instead of having the fins 55, 56 on both sides thereof. It is also contemplated that the secondary pulley 46 could not have fins.

Figure 3A:
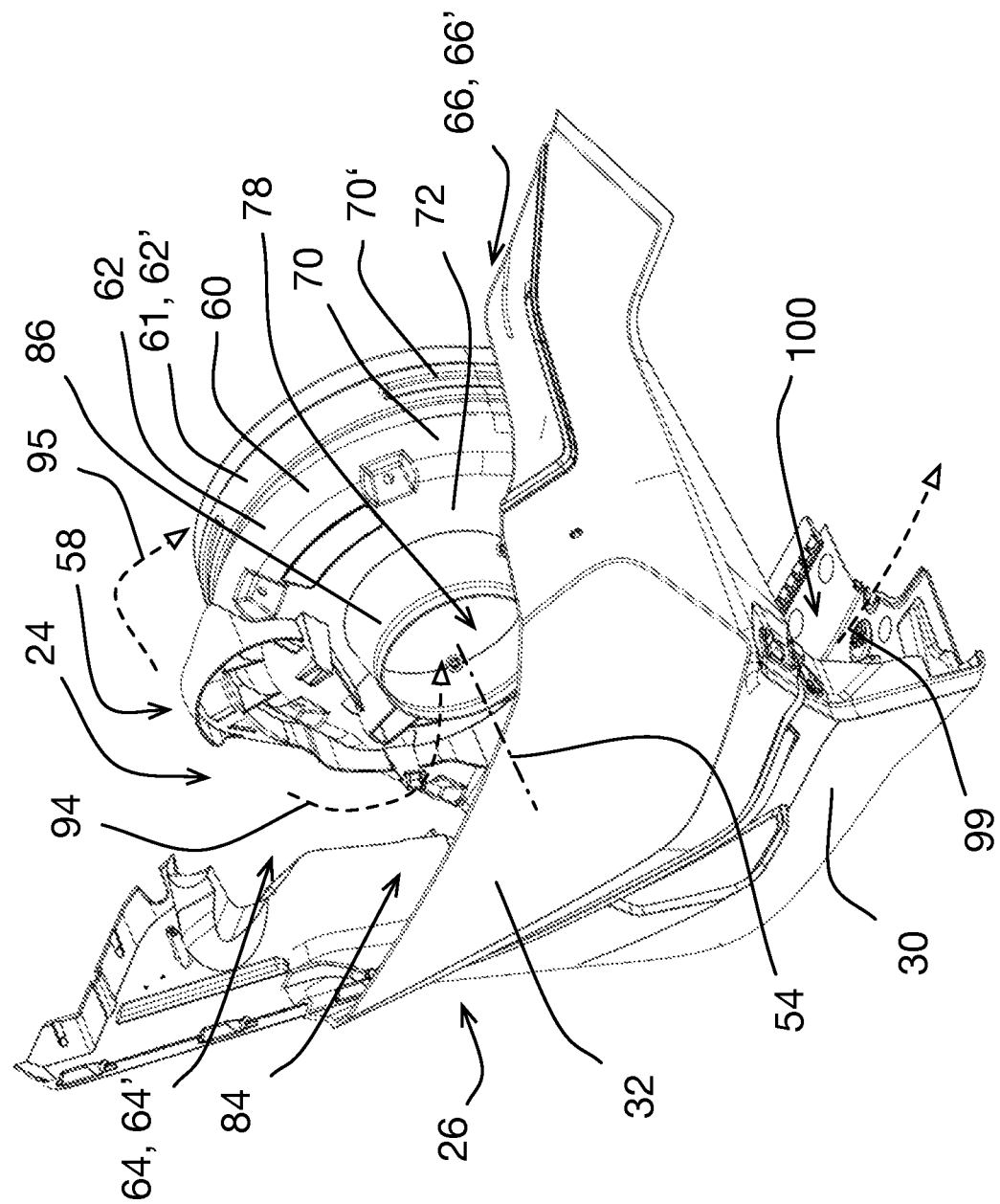
FIG. 3A is a perspective view taken from a rear, left, top side of the components of the snowmobile of FIG. 2, with the left side panel being shown as a cross-section taken along line 3A-3A of FIG. 2.
Figure 3B:
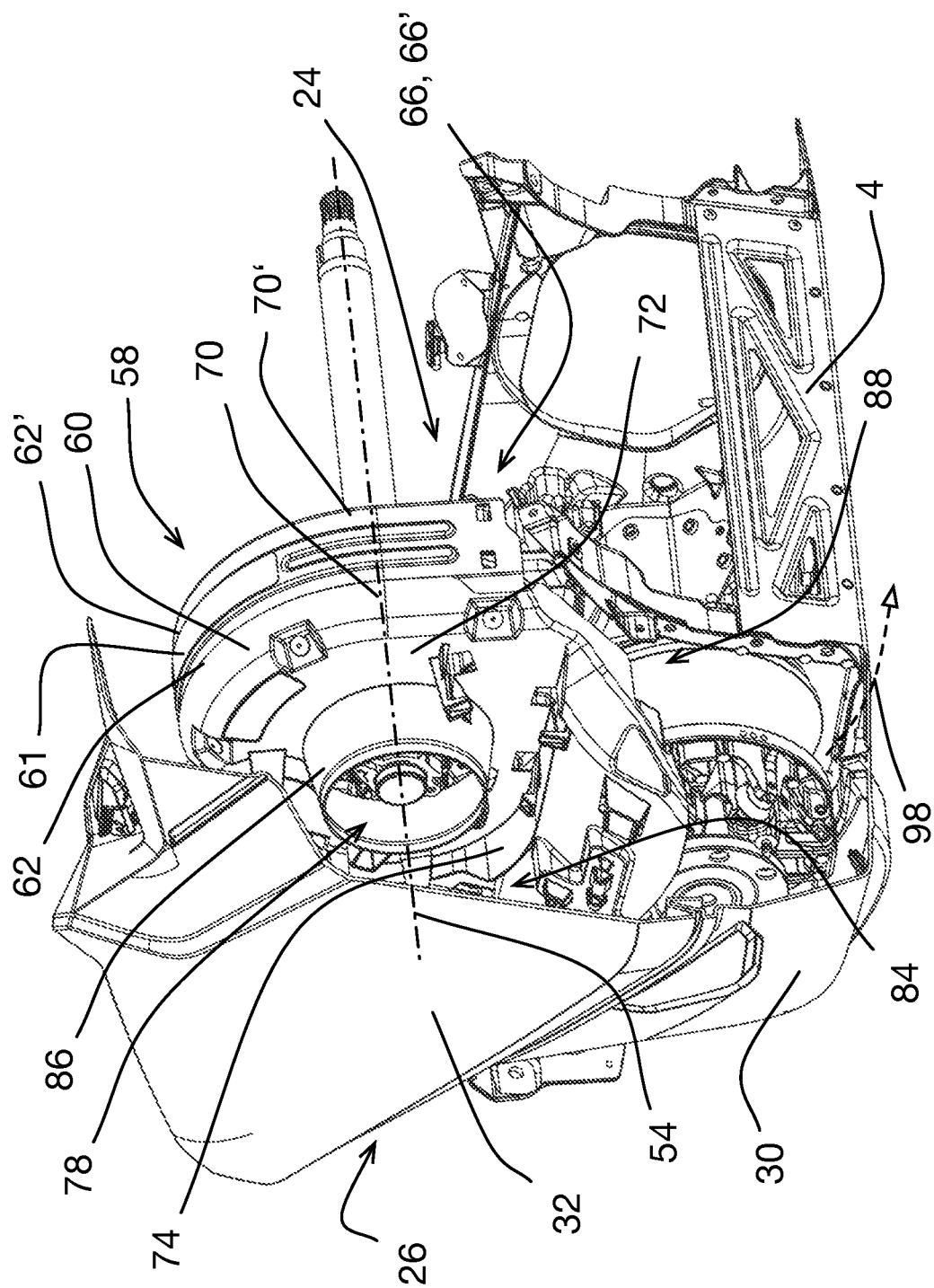
FIG. 3B is a perspective view taken from a rear, left, top side of the components of the snowmobile of FIG. 2, with the left side panel being shown as a cross-section taken along line 3B-3B of FIG. 2.
Figure 3C:
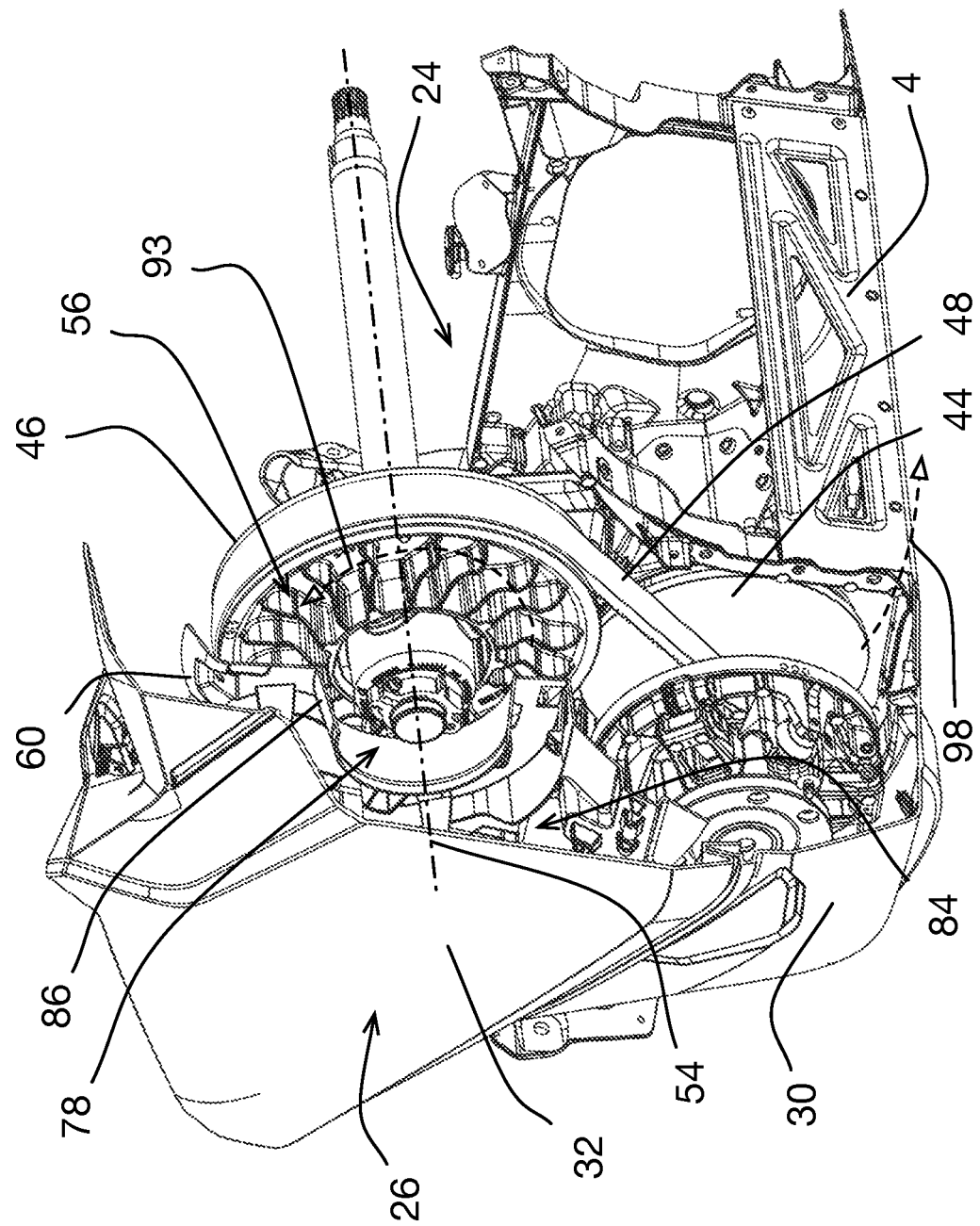
FIG. 3C is a perspective view taken from a rear, left, top side of the components of the snowmobile of FIG. 2, with the left side panel and a pulley guard assembly of the components being shown as a cross-section taken along line 3B-3B of FIG. 2.

With reference to FIGS. 3A and 3B, a pulley guard assembly 58 is disposed over the secondary pulley 46 and part of the endless flexible member 48, laterally between the engine 22 and the lateral left side 42 of the cowlings 26. In the present implementation, and as best shown in FIG. 6, the pulley guard assembly 58 is also disposed over a part of the primary pulley 44.

In the present implementation, the pulley guard assembly 58 includes a side cover 60 and a pulley guard 61. The pulley guard 61 is generally U-shaped and positioned over a part of the secondary pulley 46 around the front, top, and rear sides of the secondary pulley 46. As best shown in FIG. 2, the pulley guard 61 has an arcuate top wall 62' having a front end 64' and a rear end 66', a front wall 68' extending downward from the front end 64' of the arcuate top wall 62', a rear wall 70' extending downward from the rear end 66' of the arcuate top wall 62'. In the present implementation, the pulley guard 61 is made out of metal. It is contemplated that other manufacturing methods could be used. In the present implementation, the pulley guard 61 is removably fixed to a portion of the frame 4. The side cover 60 is fixed to a left side of the pulley guard 61. In the present implementation, the side cover 60 is injection molded plastic. It is contemplated that other manufacturing methods could be used. It is also contemplated that the side cover 60 and the pulley guard 61 could be made integral to each other, such as by being an injection molded single piece of plastic for example.

Figure 4:
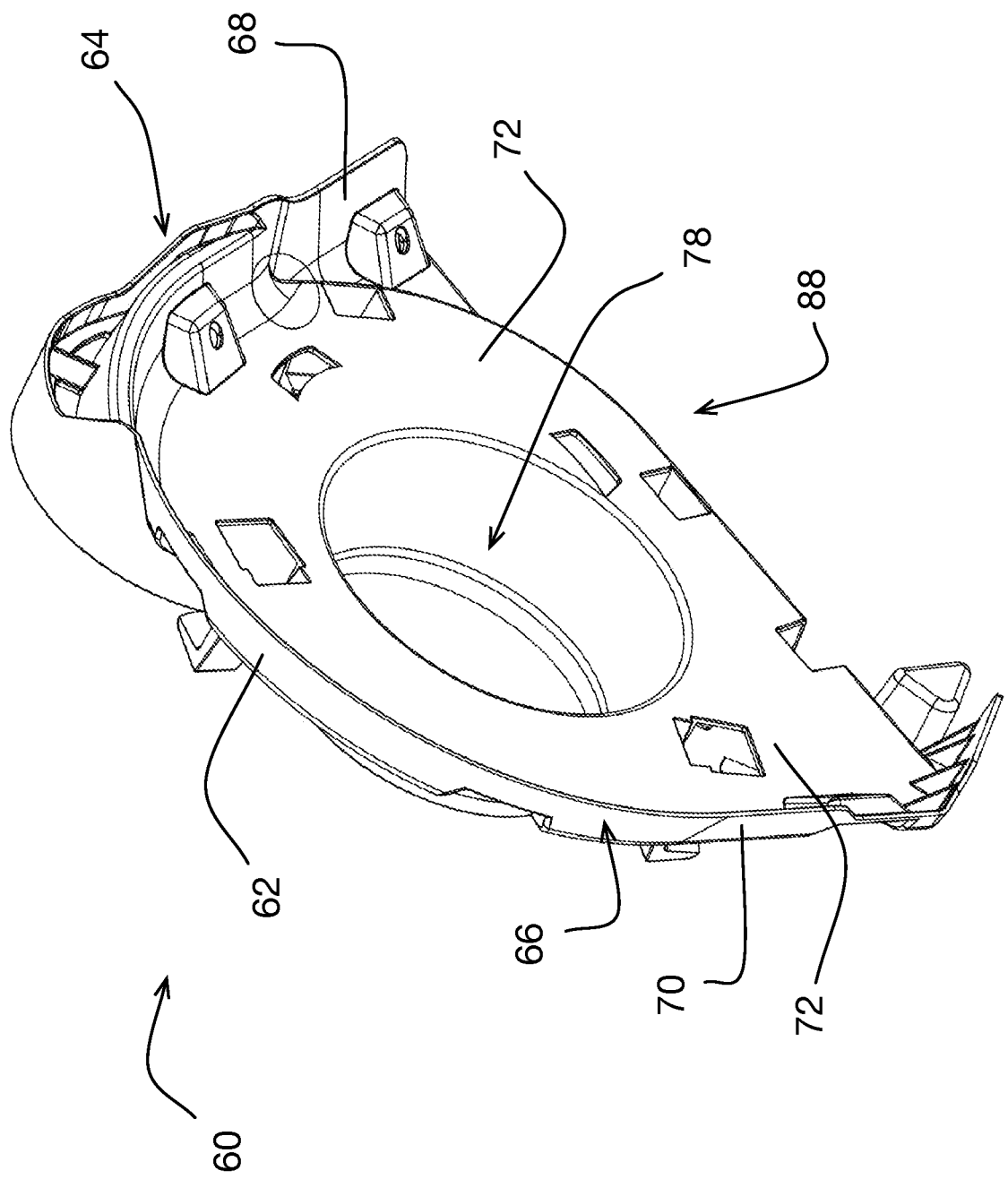
FIG. 4 is a perspective view taken from a rear, top, right side of a side cover of the pulley guard assembly of FIG. 2.
Figure 5:
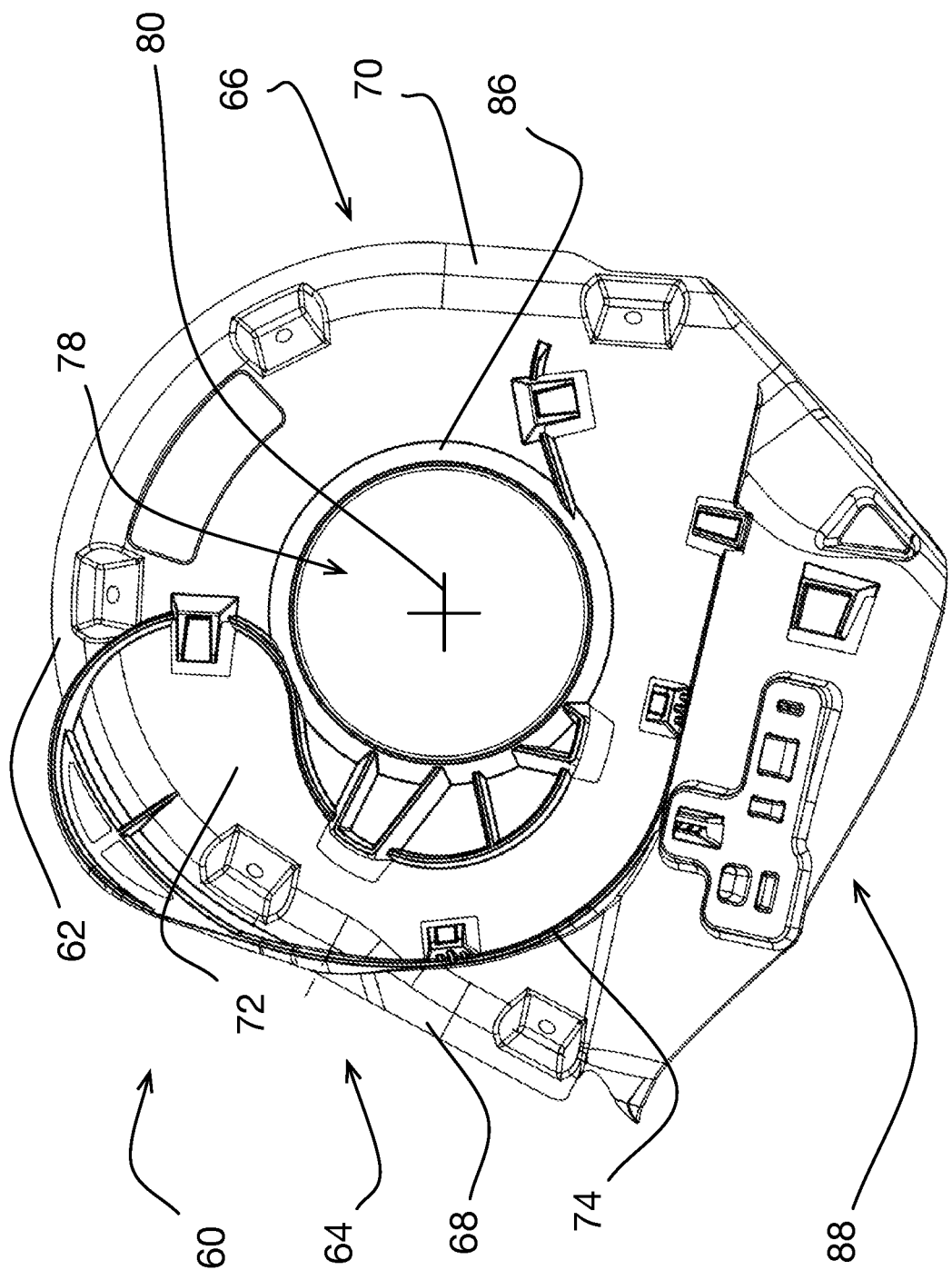
FIG. 5 is a left side elevation view of the side cover of the pulley guard assembly of FIG. 4.
Figure 6A:
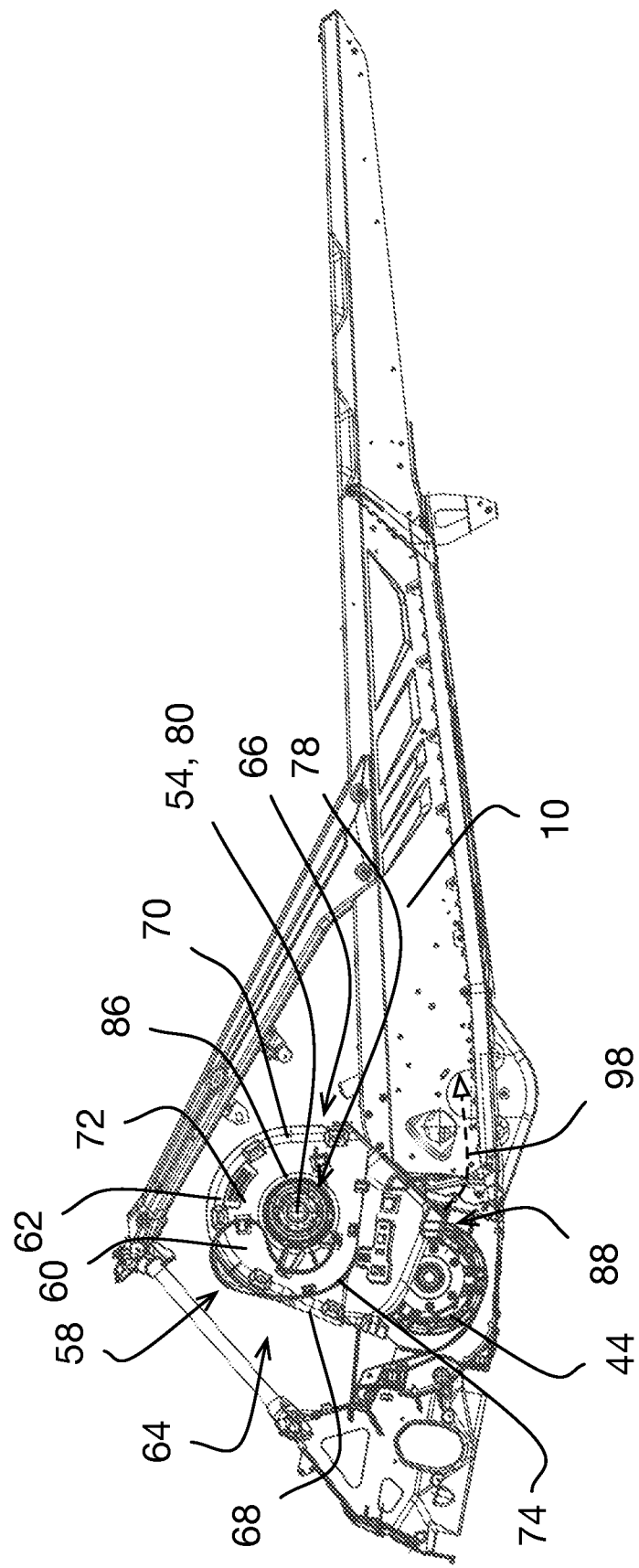
FIG. 6A is a left side elevation view of part of a frame, a side cover of the pulley guard assembly, a CVT pulley and a left side footrest of the snowmobile of FIG. 1A.

The side cover 60 is shown in more detail in FIGS. 4 to 6. As best shown in these figures, the side cover 60 has an arcuate top wall 62 having a front end 64 and a rear end 66, a front wall 68 extending downward from the front end 64 of the arcuate top wall 62, a rear wall 70 extending downward from the rear end 66 of the arcuate top wall 62, and a side wall 72 connected to one side of the arcuate top wall 62, the front wall 68 and the rear wall 70. In the present implementation, the front wall 68 extends downward and forward from the front end 64 of the arcuate top wall 62, and the rear wall 70 extends downward and forward from the rear end 66 of the arcuate top wall 62. The front wall 68 and the rear wall 70 diverge from each other as they extend downward from the arcuate top wall 62. As shown in FIG. 6A, the side wall 72 extends downward from the arcuate top wall 62 and covers a part of the primary pulley 44. As shown in FIGS. 5 and 6A, in the present implementation, the side wall 72 includes a spare CVT belt holder 74. It is contemplated that the spare CVT belt holder 74 could be omitted. In the present implementation, the arcuate top wall 62, the front wall 68 and the rear wall 70 of the side cover 60 connects with the arcuate top wall 62', the front wall 68' and the rear wall 70' of the pulley guard 61, respectively.

Figure 6B:
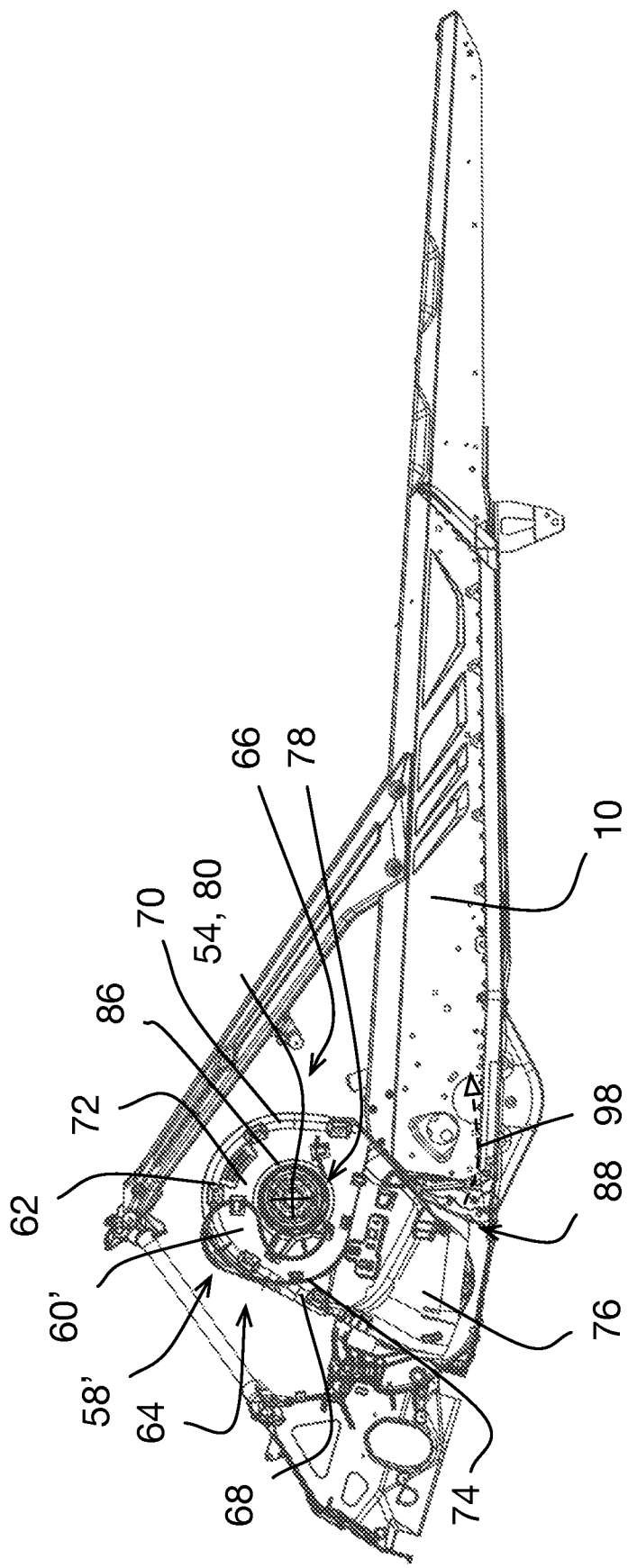
FIG. 6B is a left side elevation view of the components of FIG. 6A, with the side cover including a second side wall covering the CVT pulley of FIG. 6A.

FIGS. 6B and 6C illustrate a pulley guard assembly 58' having a side cover 60' that is an alternative implementation of the side cover 60. For simplicity, the features of the pulley guard assembly 58' and the side cover 60' that correspond to those of the pulley guard assembly 58 and the side cover 60, respectively, have been labeled with the same reference numerals in the figures and will not be described again in detail. The side cover 60' includes a second sidewall 76 that is attached at a bottom end of the side wall 72. The second sidewall 76 extends downward from the bottom end of the side wall 72 and covers the of the primary pulley 44 almost entirely.

The side wall 72 defines an air inlet 78 therein. As best shown in FIG. 5, an axis of curvature 80 of the arcuate top wall 62 passes through a center 82 of the air inlet. As best shown in FIG. 3A, in the present implementation, the air inlet 78 faces the lateral left side 42 of the cowlings 26 and is open to the engine compartment 24. More particularly, the air inlet 78 is open to a space 84 defined in the engine compartment 24 between the pulley guard assembly 58 and the left side panel 32 of the cowlings 26. The space 84 is part of the engine compartment 24 and is in fluid communication with the air inlet 78 of the pulley guard assembly 58.

As best shown in FIG. 3, in the present implementation, the air inlet 78 is defined by a plastic flange 86 extending generally away from a left side surface of the side wall 72 of the pulley guard assembly 58, toward an inner surface of the left side panel 32. The flange 86 terminates short of an inner surface of the left side panel 32 to facilitate flow of air through the air inlet 78. The flange 86 is orthogonal to the side wall 72. It is contemplated that the air inlet 78 could be defined by a different structure, and need not include the flange 86 for example.

As best shown in FIGS. 2 and 5, in the present implementation, the air inlet 78 is positioned in the side wall 72 such that the secondary pulley axis 54 passes through the air inlet 78. In the present implementation, and as shown in FIG. 6A for example, the air inlet 78 is circular and the secondary pulley axis 54 passes through the center of the circular shape of the air inlet 78. In other implementations, the air inlet 78 has different shapes, including an elliptical shape. In some implementations, the secondary pulley axis 54 does not pass through a center of the shape of the air inlet 78 and is positioned at least in part over the secondary pulley 46.

As best shown in FIG. 4, in the present implementation, the pulley guard assembly 58, 58' is open on a side thereof opposite the side wall 72 and is open at a bottom thereof and thereby defines an air outlet 88 of the pulley guard assembly 58, 58'. In some implementations, the air outlet 88 of the pulley guard assembly 58, 58' is partially defined as an aperture in the pulley guard assembly 58, 58'.

In the implementation shown in FIGS. 6B and 6C, the side cover 60' is open at a rear end of the second side wall 76. This is shown in more detail in FIG. 6C. As shown, the second side wall 76 includes a longitudinally extending wall 90 and a transverse wall 92 that extends rightward from a rear end of the longitudinally extending wall 90. A bottom end of the transverse wall 92 terminates above a bottom end of the longitudinally extending wall 90 to define the air outlet 88.

In both implementations, when the engine 22 is rotating, air is sucked into the pulley guard assembly 58 or 58' via the air inlet 78 from the space 84, as shown schematically by reference arrow 94 in FIG. 3A, by the fins 56 on the left side of the secondary pulley 46. Air being moved by the fins 56 on the left side of the secondary pulley 46 is also shown by reference arrow 93 in FIG. 3C. As shown by reference arrow 95 in FIGS. 2 and 3A, air is also sucked toward the secondary pulley 46 directly from the engine compartment 24 by the fins 55 on the right side of the secondary pulley 46. Air being moved by the fins 55 on the right side of the secondary pulley 46 is also shown with reference arrow 96 in FIG. 2.

In this implementation, the fins 55 on the right side of the secondary pulley 46 are smaller than the fins 56 on the left side of the secondary pulley 46 and move less air than the fins 56 on the left side of the secondary pulley 46. It is contemplated that the fins 55 on the right side of the secondary pulley 46 could be sized equal to, or larger than the fins 56 on the left side of the secondary pulley 46.

Airflows 94 and 95 produced by the fins 55, 56 on each side of the secondary pulley 46 merge and mix as they flow around the secondary pulley 46, the CVT belt 48, and the primary pulley 44, downwards past the primary pulley 44 toward the bottom pan 30 and exit the pulley guard assembly 58 or 58' via the air outlet 88 as best shown by reference arrows 97 and 98 in FIG. 2. The airflows 94 and 95 cool the primary pulley 44, the secondary pulley 46 and the CVT belt 48 as they pass through the pulley guard assembly 58 or 58'. When the pulley guard assembly 58 is in use, airflow 98 exits the snowmobile 2 via an air outlet 100 defined by the left side panel 32, the bottom pan 30 and the frame 4 of the snowmobile 2, as shown by reference numeral 99 in FIG. 3A. When the pulley guard assembly 58' is in use, the air outlet 100 is defined by the pulley guard assembly 58', the bottom pan 30 and the frame 4 of the snowmobile 2. In some applications, the pulley guard assembly 58' reduces some of the noise produced by the snowmobile 2.

When the engine 22 drives the primary pulley 44 and the secondary pulley 46 about their respective rotation axes 50, 54, ambient air is drawn from outside of the snowmobile 2 into the engine compartment 24 via openings such as apertures 27 defined in the hood 28 and in a top part of the left side panel 32, or via gaps between some adjacent ones of the cowlings 26 that define the engine compartment 24, then into the space 84, and then into the pulley guard assembly 58 or 58' via the air inlet 78. The apertures 27 defined in the top part of the left side panel 32 are shown with more detail in FIG. 1B. As shown with arrow 85 in FIG. 1C, part of the flow of ambient air enters the engine compartment 24 via the apertures 27 in the top part of the left side panel 32.

In the present implementation, the airflow 99 (FIG. 3A) is increased by the fins 52 of the primary pulley 44. In other words, the fins 52 of the primary pulley 44 increase intensity of airflow 99 out of the air outlet 100. In some implementations, the primary pulley 44 has no fins and the airflow 94, 96, 98 is primarily induced by the fins 55 and/or 56 of the secondary pulley 46. In some implementations, the secondary pulley 46 also lacks fins, in which case airflow is created in the pulley guard assembly 58 as a result of movement of the pulleys 44, 46 and the CVT belt 48. In some implementations, the primary pulley 44 is the only one of the pulleys 44, 46 that has fins 52.

In the present implementation, the CVT 40, the pulley guard assembly 58 and the air outlet 88 are positioned on the left side of the engine 22, and the air outlet 100 is in front of the left side footrest 10 and rearward of the air outlet 88 of the pulley guard assembly 58. As shown schematically in FIGS. 2 and 6A, airflow 98 that leaves the pulley guard assembly 58 flows rearward along a part of the left side footrest 10. As shown in FIGS. 6B and 6C, in implementations having the pulley guard assembly 58' including the second side wall 76, air 98 leaves the pulley guard assembly 58' under the bottom end of the transverse wall 92 (FIG. 6C) of the side cover 60'.

In some implementations, the CVT 40, the pulley guard assembly 58 or 58', the air outlet 100 of the left side panel 32 and the air outlet 88 of the pulley guard assembly 58 or 58', are positioned on the right side of the engine 22 and the airflow 98 is directed toward the right side footrest. It is contemplated that the air outlet 88 of the pulley guard assembly 58 or 58' could be positioned in the pulley guard assembly 58 or 58' to direct the airflow 98 toward other parts of the snowmobile 2 and/or other parts of a driver of the snowmobile 2 instead of or in addition to a corresponding one of the footrests 10.

Figure 7:
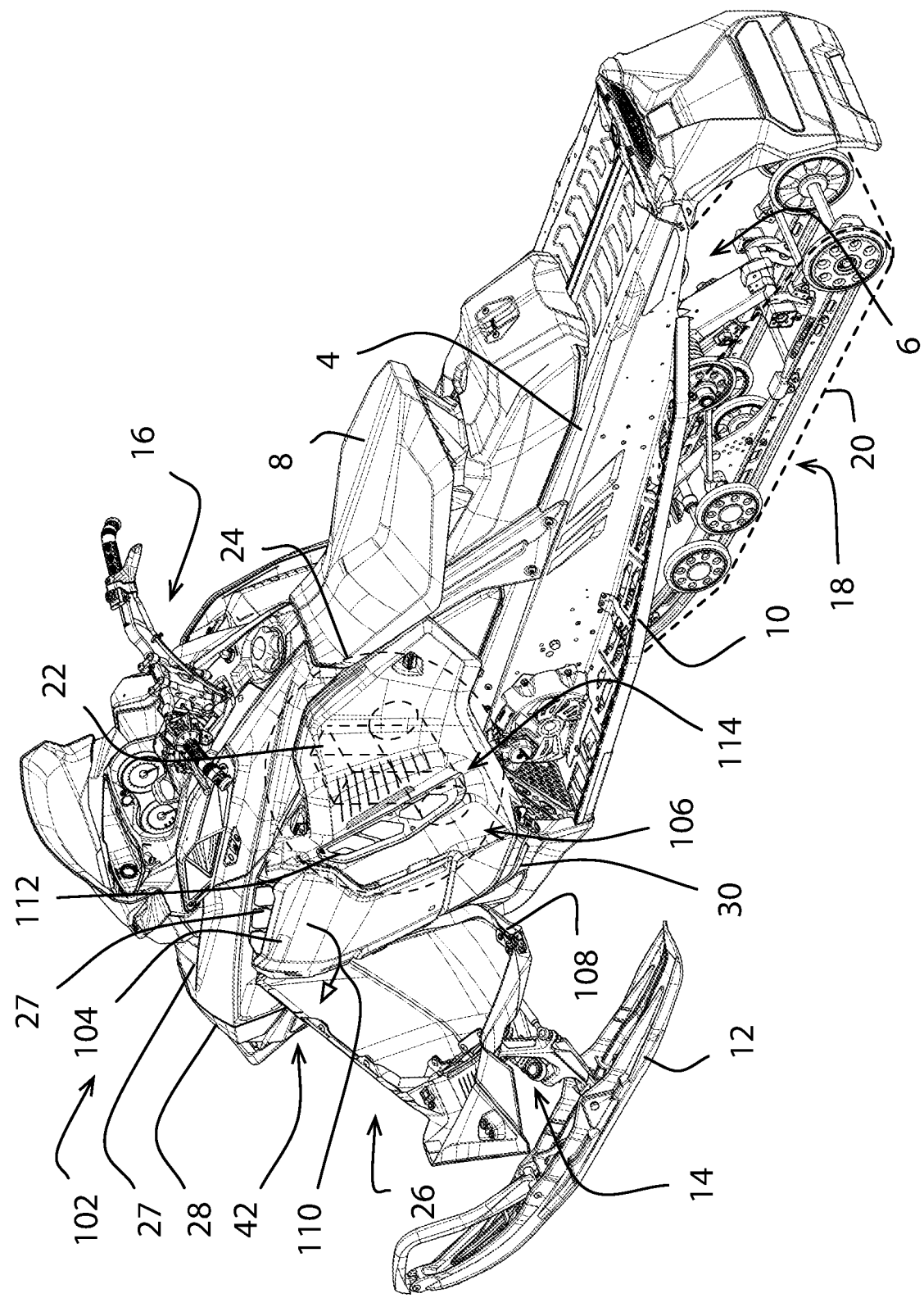
FIG. 7 is a perspective view taken from a rear, left, top side of a snowmobile according to another implementation, the snowmobile having an air inlet defined in a left side panel of the snowmobile.
Figure 8:
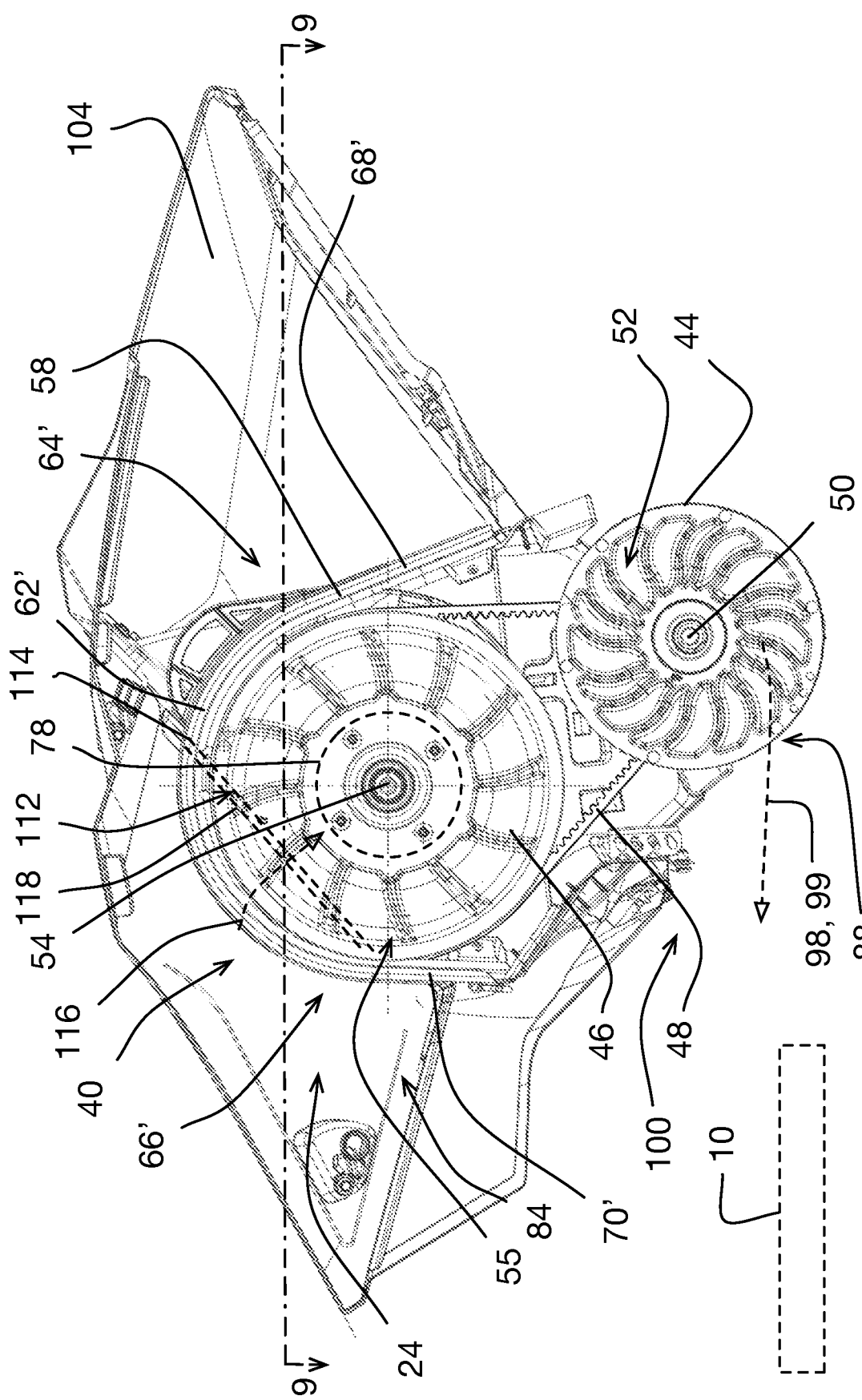
FIG. 8 is a right side elevation view of CVT pulleys, a pulley guard assembly, a left side panel and a cover of the air inlet of the snowmobile of FIG. 7.
Figure 9:
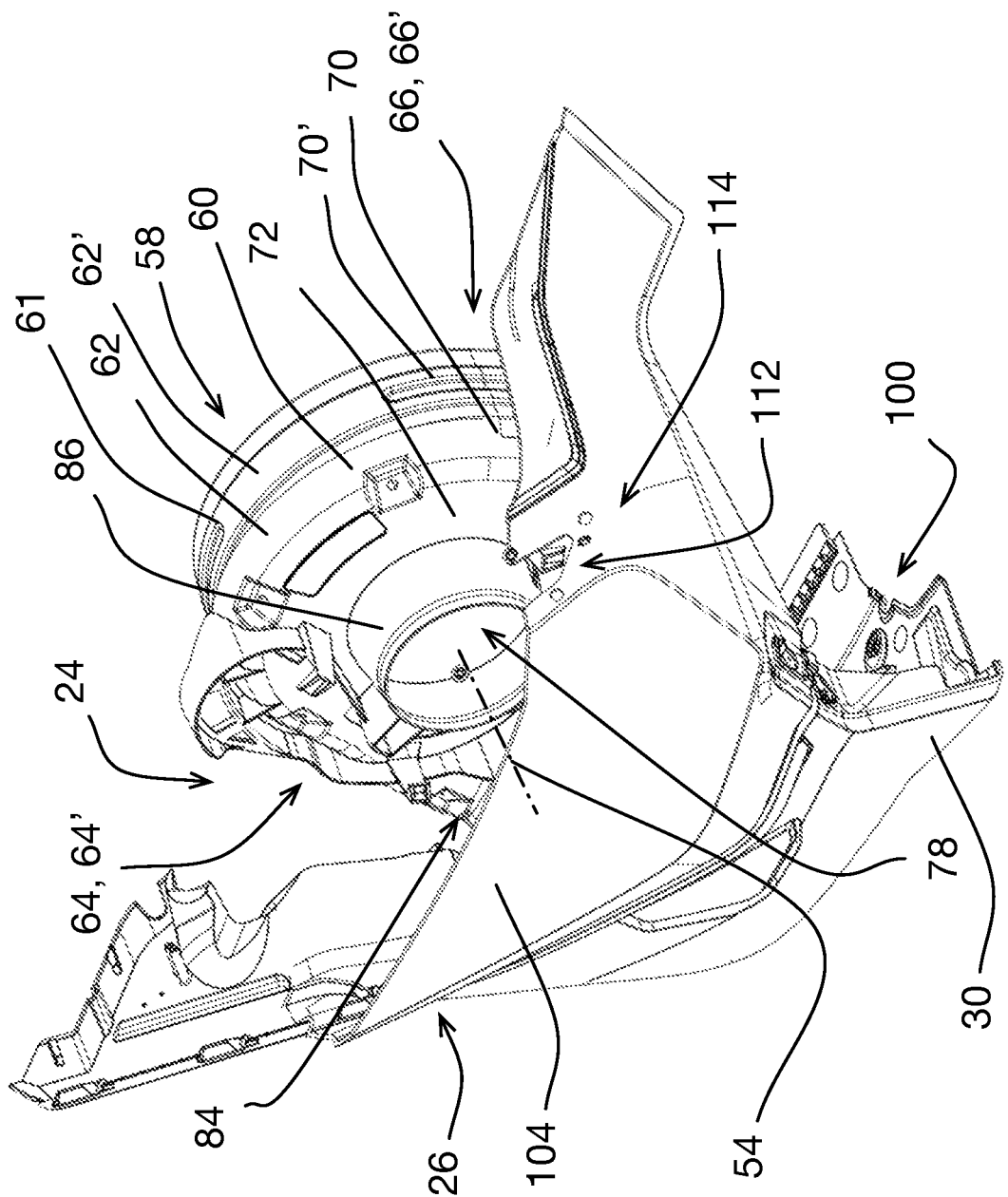
FIG. 9 is a perspective view taken from a rear, left, top side of the components of the snowmobile of FIG. 8, with the cover of the air inlet removed and with the left side panel being shown as a cross-section taken along line 9-9 of FIG. 8.

Now referring to FIGS. 7 to 9, a snowmobile 102 is shown. The snowmobile 102 is an alternative implementation of the snowmobile 2. Elements of the snowmobile 102 that are the same as corresponding elements of the snowmobile 2 have been labeled with the reference numerals of the corresponding elements of the snowmobile 2.

Similar to the left side panel 32 of the snowmobile 2, the left side panel 104 of the snowmobile 102 is pivotable between a closed position 106 and an open position 108. The left side panel 104 is in the closed position 106 in FIG. 7. The open position 108 of the left side panel 104 is also shown in FIG. 7. Still referring to FIG. 7, the pivoting movement of the left side panel 104 from the closed position 106 to the open position 108 is shown schematically with reference arrow 110.

As shown in FIGS. 7 to 11, the snowmobile 102 has an air inlet 112 defined in the left side panel 104. As shown in FIG. 7, the air inlet 112 is defined in a rearward facing portion 114 of the left side panel 104. In some implementations, the air inlet 112 is defined in other parts of the cowlings 26 of the snowmobile 102.

As shown in FIGS. 8 and 9, in this implementation, the air inlet 112 is open to the engine compartment 24 and to the space 84 that is defined between the pulley guard assembly 58 and the left side panel 104 of the snowmobile 102. The air inlet 112 thereby lets ambient air into the engine compartment 24, as shown schematically with reference arrow 116 in FIG. 8. This travel path for ambient air into the engine compartment 24 and the space 84 is relatively shorter than at least some of the air travel paths for ambient air from outside of the snowmobile 2 into the engine compartment 24 of the snowmobile 2 via the apertures 27 and gaps described herein above. This facilitates airflow into the space 84.

As shown in FIG. 7, in the present implementation, a cover 118 is connected to the left side panel 104 over the air inlet 112 to reduce entry of the elements, including snow and rain, into the air inlet 112 in some driving conditions. The cover 118 is shown in more detail in FIG. 11. As shown, the cover 118 is a grill that is fastened to the left side panel 104. It is contemplated that other suitable covers 118 could be used.

The air inlet 112 provides ambient air to the space 84, in this implementation, through the cover 118. Therefore, relatively cooler air enters the pulley guard assembly 58 in comparison with air received in the pulley guard assembly 58 from the engine compartment 24.

Figure 10:
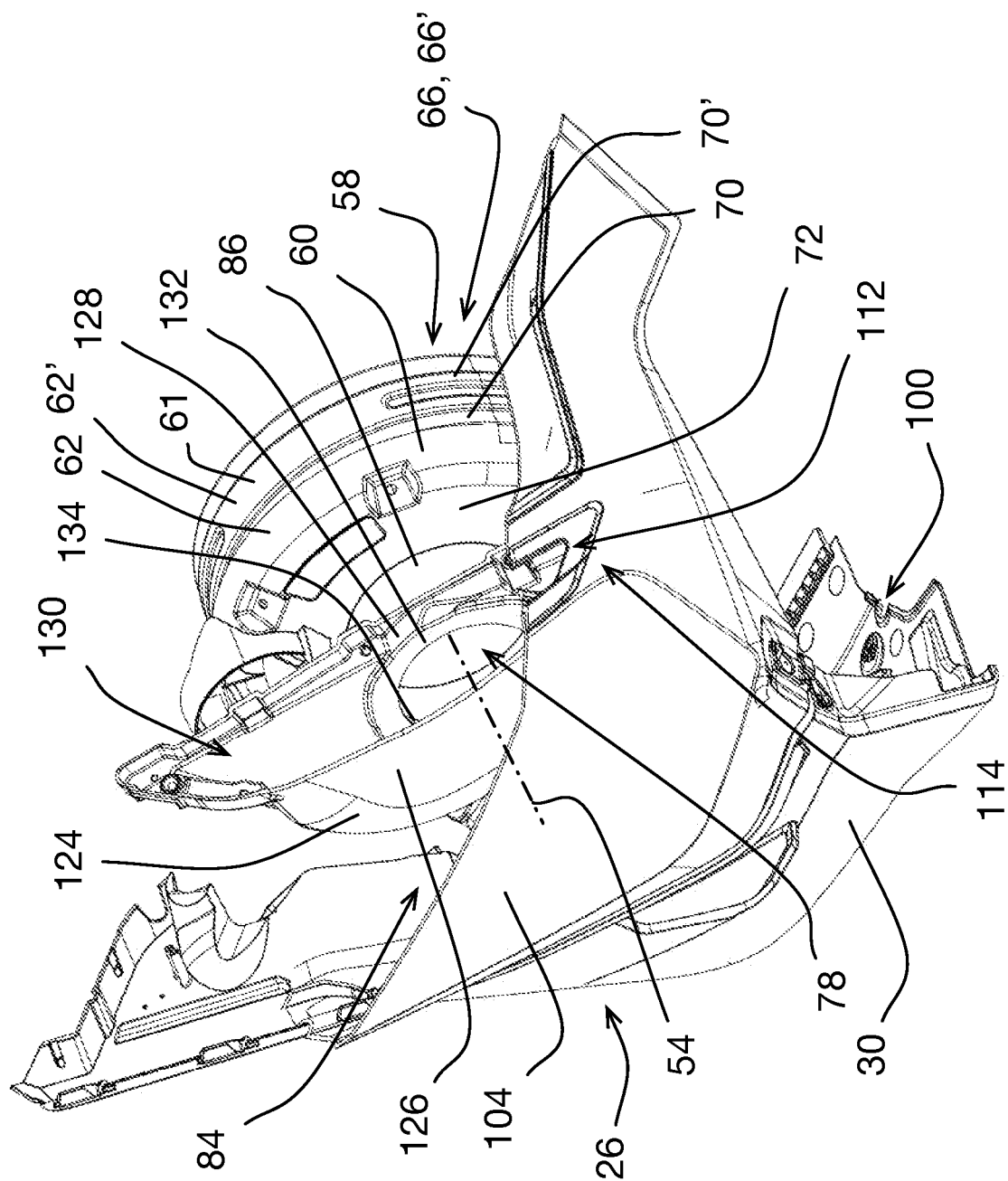
FIG. 10 is a perspective view taken from a rear, left, top side of the components of the snowmobile of FIG. 8, with the cover of the air inlet removed, with the left side panel being shown as a cross-section taken along line 9-9 of FIG. 8, and with an air duct fluidly connecting the air inlet of the left side panel to an air inlet of the pulley guard assembly.
Figure 11:
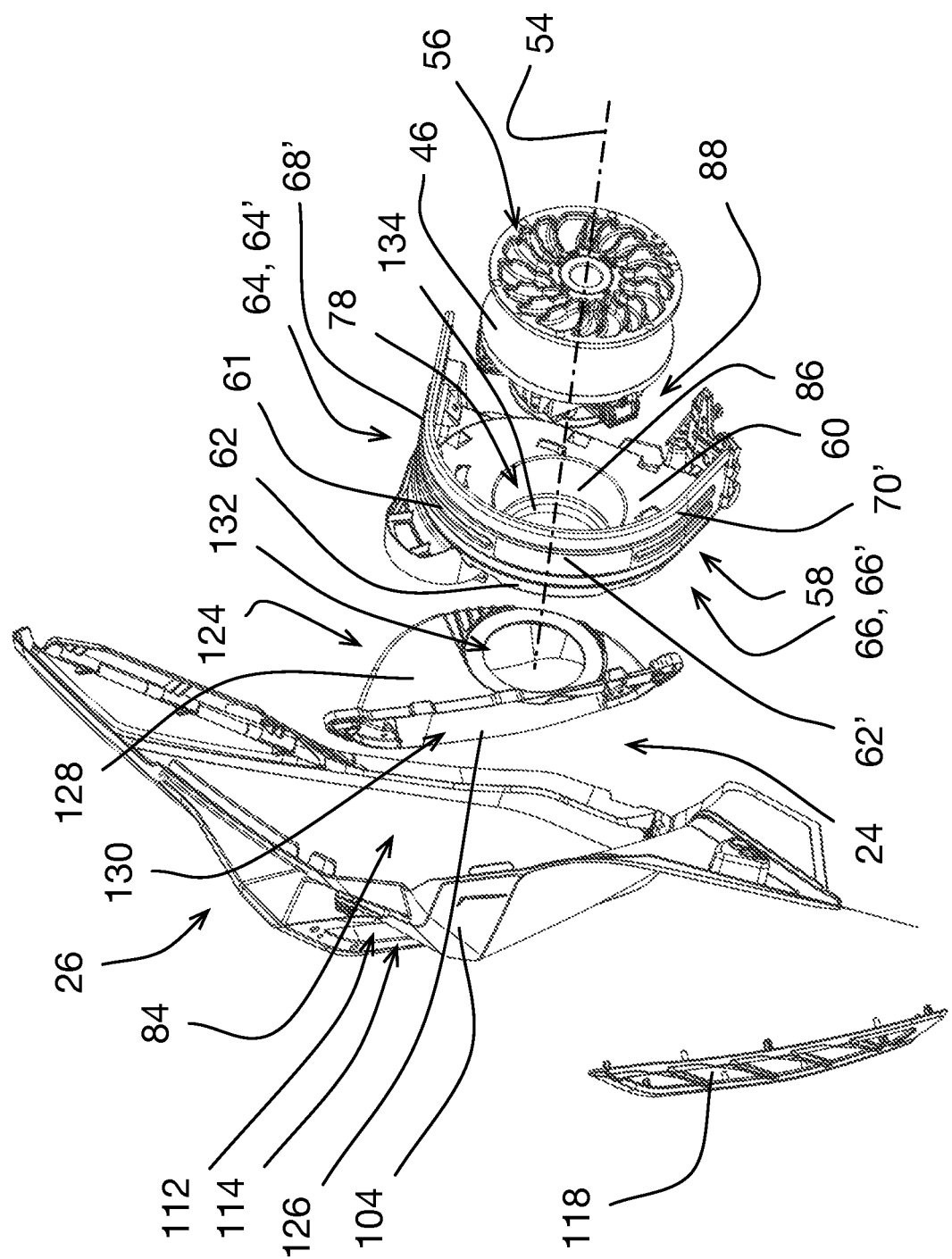
FIG. 11 is an exploded perspective view taken from a rear, right, top side of the part of the snowmobile of FIG. 10.

Now referring to FIGS. 10 and 11, in an alternative implementation, the snowmobile 102 includes an air duct 124 that fluidly connects the air inlet 112 of the cowlings 26 to the air inlet 78 of the pulley guard assembly 58 and brings ambient air directly from outside of the snowmobile 102 to the air inlet 78 of the pulley guard assembly 58. As shown, the air duct 124 has a curved left side wall 126 and a generally flat right side wall 128. The curved left side wall 126 is generally C-shaped. The left side wall 126 is molded integrally with the right side wall 128. An air inlet 130 of the air duct 124 is defined between the left and right walls 126, 128. The right side wall 128 defines an air outlet 132 therein. The air outlet 132 of the air duct 124 is fluidly connected to the air inlet 130 of the air duct 124. The air outlet 132 of the air duct 124 is circular and is sized to match the shape and size of the air inlet 78 of the pulley guard assembly 58. It is contemplated that a different shape and/or size could be used.

The air duct 124 is positioned between the pulley guard assembly 58 and the left side panel 104. The air duct 124 is attached about its air inlet 130 to the left side panel 104 of the snowmobile 102 about the air inlet 112 of the cowlings 26 and circumscribes the air inlet 112 of the cowlings 26. In this implementation, the air duct 124 is made of plastic and is attached to the left side panel 104 of the snowmobile 102 via a fasteners. In some implementations, the air duct 124 is attached to the left side panel 104 by being molded from plastic integral with the left side panel 104. It is contemplated that the air duct 124 could be attached to the left side panel 104 via any other suitable attachment. It is contemplated that the air duct 124 could be made of any other suitable materials and manufacturing methods.

As shown in FIGS. 10 and 11, when the snowmobile 102 is assembled, the air outlet 132 of the air duct 124 is positioned proximate a distal end of the flange 86 defining the air inlet 78 of the pulley guard assembly 58 and supplies ambient air to the air inlet 78 of the pulley guard assembly 58. In this implementation, a seal 134 made of foam is disposed circumferentially around the air inlet 78 and is attached to the distal end of the flange 86 with a suitable adhesive and is not connected to the air duct 124. It is contemplated that the seal 134 could be made of any other suitable materials and manufacturing methods. It is contemplated that a different seal 134 could be used. It is contemplated that a different attachment of the seal 134 to the pulley guard assembly 58 could be used.

An outer surface of the seal 134 contacts the air duct 124 circumferentially about the air outlet 132 of the air duct 124 and thereby helps reduce or prevent passage of air from the engine compartment 24 into the air inlet 78. It is contemplated that the air duct 124 could be attached to the flange 86 and/or other part of the pulley guard assembly 58 or 58', and/or the seal 134 in addition to being attached to the left side panel 104. It is contemplated that in some such implementations, the side cover 60 or 60' could be made removable from the pulley guard 61 by moving the left side panel 104 to its open position 108 such that the side cover 60 or 60' would move with the left side panel 104 and the air duct 124 to the open position 108. It is contemplated that a suitable removable connection, such as a snap fit connection for example, between the side cover 60 or 60' and the pulley guard 61 could be used in such implementations.

It is contemplated that in some implementations in which the air duct 124 is attached to the flange 86 and/or other part of the pulley guard assembly 58 or 58' and/or the seal 134 in addition to being attached to the left side panel 104, the pulley guard assembly 58 or 58' could be made removable from the frame 4 by moving the left side panel 104 to its open position 108. In such implementations, the pulley guard assembly 58 or 58' could move with the left side panel 104 and the air duct 124 to the open position 108. It is contemplated that a suitable removable connection, such as a snap fit connection for example, between the pulley guard 61 and the frame 4 could be used in such implementations.

It is contemplated that the air duct 124 could be attached to the flange 86 and/or other part of the pulley guard assembly 58 and/or the seal 134 instead of being attached to the left side panel 104. It is contemplated that in some such implementations, the left side panel 104 would be movable to its open position 108 without moving the air duct 124.

It is also contemplated that the seal 134 and/or the flange 86 could be omitted, in which case the air outlet 132 of the air duct 124 could be, for example, sufficiently close to the part(s) of the pulley guard assembly 58 or 58', defining the air inlet 78 of the pulley guard assembly 58 or 58', and/or could be attached to the pulley guard assembly 58 or 58', circumferentially around the air inlet 78 to reduce and/or eliminate passage of air into the air inlet 78 from the engine compartment 24 and/or from the space 84. It is also contemplated that the flange 86 could be connected to the air duct 124 instead of to the pulley guard assembly 58 or 58'.

In the implementation shown in FIGS. 10 and 11, when the left side panel 104 of the snowmobile 102 is in the closed position 106, the air outlet 132 of the air duct 124 is positioned proximate the air inlet 78 of the pulley guard assembly 58 or 58', as described herein above. When the left side panel 104 of the snowmobile 102 is in the open position 108, shown schematically in FIG. 7, the air duct 124 moves together with the left side panel 104 but without moving the side cover 60, 60' or the pulley guard assembly 58, 58'. As a result, the air outlet 132 of the air duct 124 is spaced from the air inlet 78 of the pulley guard assembly 58 and provides service access to the air inlet 78.

When the snowmobile 102 is in use, the air duct 124 delivers ambient air from outside of the snowmobile 102 to the air inlet 78 of the pulley guard assembly 58 or 58', without first introducing this ambient air into the engine compartment 24 or the space 84 in the engine compartment 24 of the snowmobile 102. Air in the engine compartment 24 is generally warmer than ambient air. Therefore, the direct air connection provided by the air duct 124 from outside of the snowmobile 102 to the air inlet 78 of the pulley guard assembly 58 or 58', delivers relatively cooler air to the pulley guard assembly 58 or 58' via the air inlet 78 of the pulley guard assembly 58 or 58' in some operating conditions of the snowmobile 102, in comparison with implementations in which in similar operating conditions air enters the air inlet 78 of the pulley guard assembly 58 or 58' from the engine compartment 24.

Now referring to FIGS. 12 to 16, a snowmobile 140 is shown. The snowmobile 140 is an alternative implementation of the snowmobile 102. Elements of the snowmobile 140 that are the same as corresponding elements of the snowmobile 102 have been labeled with the reference numerals of the corresponding elements of the snowmobile 102.

Figure 12:
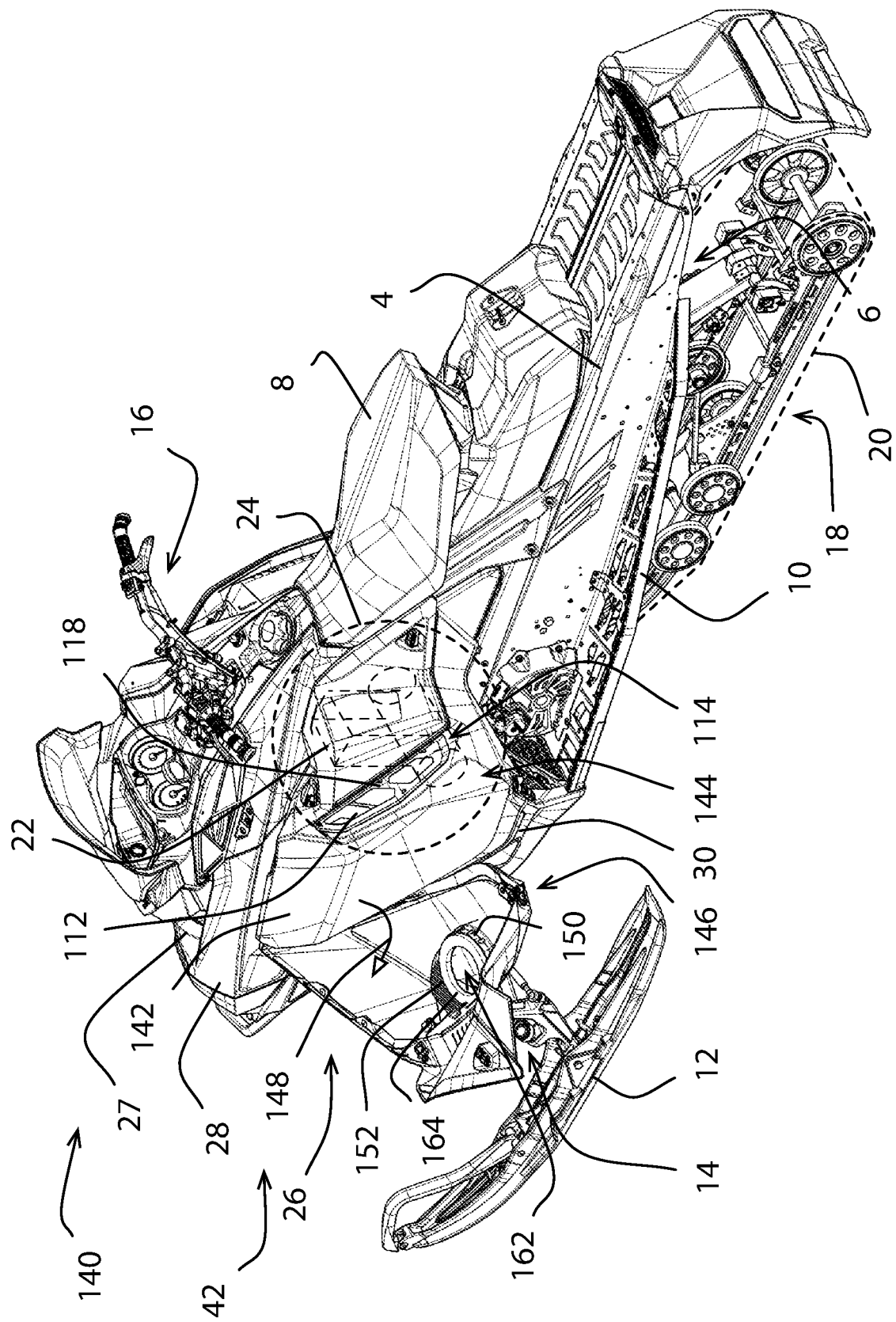
FIG. 12 is a perspective view taken from a rear, left, top side of a snowmobile according to another implementation, the snowmobile having an air inlet defined in a left side panel of the snowmobile.

Similar to the left side panel 104 of the snowmobile 102, the left side panel 142 of the snowmobile 140 is pivotable between a closed position 144 and an open position 146. Both the closed position 144 and the open position 146 are shown in FIG. 12. Still referring to FIG. 12, the pivoting movement of the left side panel 142 from the closed position 144 to the open position 146 is shown schematically with reference arrow 148.

As seen in FIG. 12, one difference between the snowmobile 140 and the snowmobile 102 is that the left side panel 142 of the snowmobile 140 does not define air inlet apertures in an upper portion of the left side panel 142 above the air inlet 112. As also seen in FIG. 12, another difference between the snowmobile 140 and the snowmobile 102 is that the snowmobile 140 includes an air funnel 150 attached to an inner side of the left side panel 142.

Figure 13:
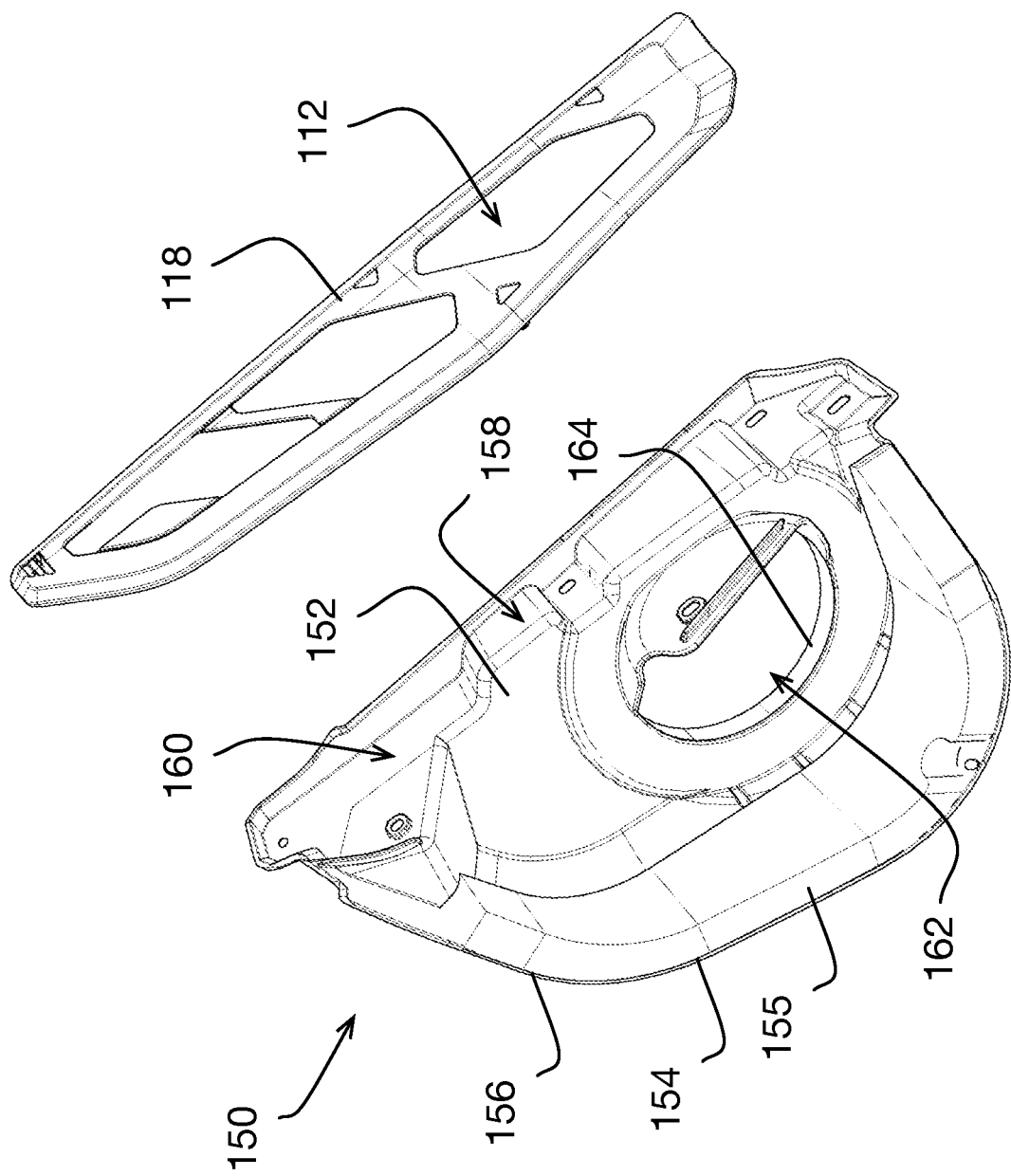
FIG. 13 is a perspective view taken from a rear, left, top side of an air funnel and an air inlet cover of the snowmobile of FIG. 12.

Referring to FIG. 13, the air funnel 150 has a right side wall 152, a curved front wall 154, and no left side wall. The curved front wall 154 is generally C-shaped and is lined with foam 155 for acoustic insulation. The right side wall 152 is molded integrally with the curved front wall 154. Instead of having a left side wall, a left side outer contour 156 of the curved front wall 154 is shaped to conform to and is attached to the inner side of the left side panel 142. Thus, in the present embodiment, the inner side of the left side panel 142 forms the left side wall of the air funnel 150 and together with the right side wall 152 and the curved front wall 154 defines an air duct 158.

As shown in FIG. 13, the air duct 158 has an air inlet 160 and an air outlet 162 fluidly connected to the air inlet 160. As best shown in FIG. 15, the air inlet 160 is defined by the right side wall 152 and the inner side of the left side panel 142. The air inlet 160 circumscribes the air inlet 112 of the cowlings 26 and fluidly connects the air inlet 112 of the cowlings 26 to the air outlet 162. The air outlet 162 is defined in the right side wall 152. The air outlet 162 is circular and is sized to match the shape and size of the air inlet 78 of the pulley guard assembly 58 to fluidly connect the air inlet 112 of the cowlings 26 to the air inlet 78 (FIG. 14) of the pulley guard assembly 58. The air duct 158 thus brings ambient air directly from outside of the snowmobile 140 to the air inlet 78 of the pulley guard assembly 58. Although not shown to maintain clarity of the figures, a mesh covers the cover 118 of the air inlet 112 and helps prevent the elements, such as water and snow, from entering the air inlet 112. It is contemplated that any other suitable structure could be used for keeping the elements out of the air duct 158.

In this implementation, the air funnel 150 is made of plastic and is attached to the inner side of the left side panel 142 of the snowmobile 140 via fasteners. In some implementations, the air funnel 150 is attached to the left side panel 142 by being molded from plastic integral with the left side panel 142. It is contemplated that the air funnel 150 could be attached to the left side panel 142 via any other suitable attachment. It is contemplated that the air funnel 150 could be made of any other suitable materials and be made by any suitable manufacturing methods.

Figure 14:
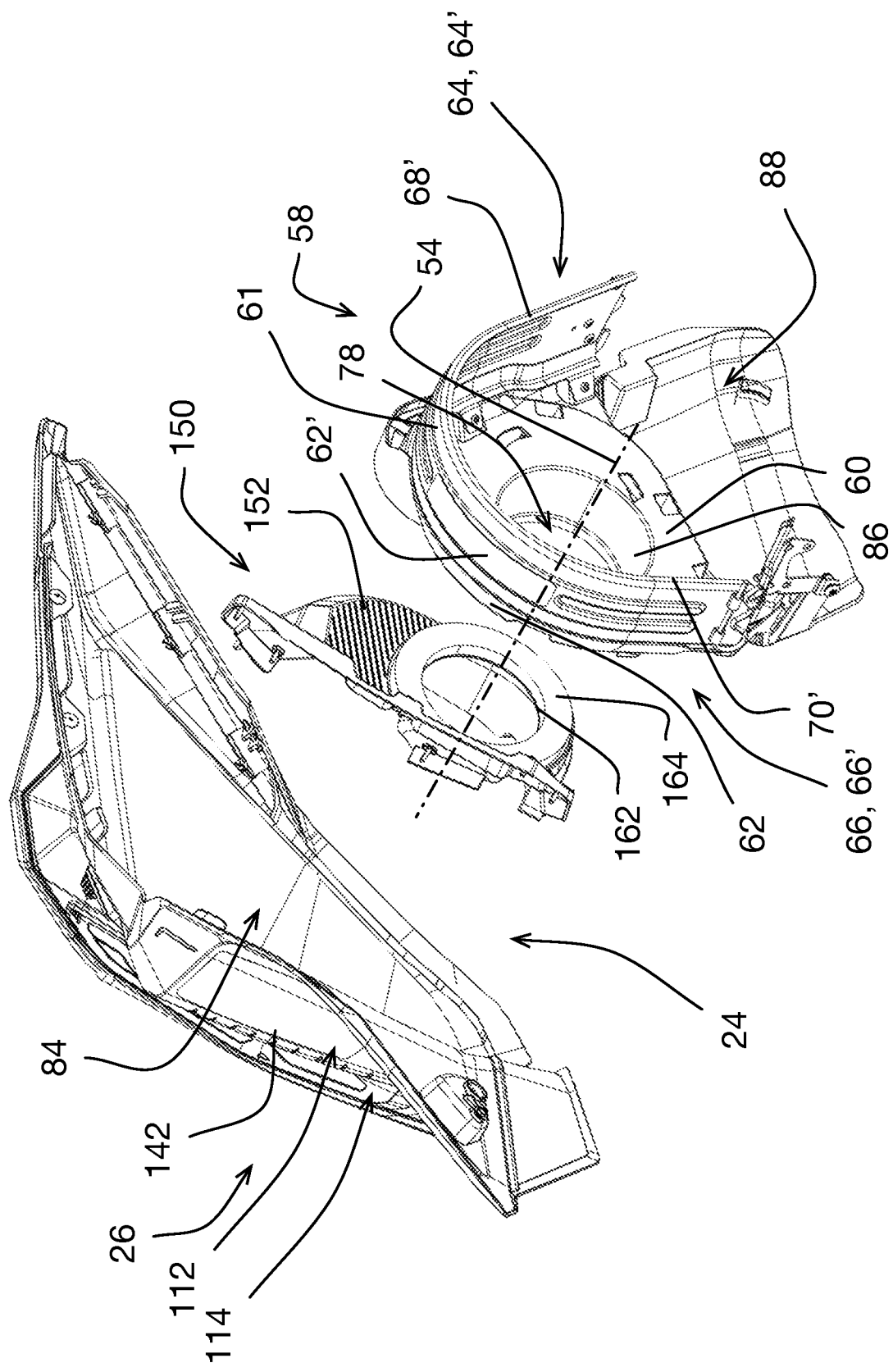
FIG. 14 is an exploded perspective view of a part of the snowmobile of FIG. 12 taken from a rear, right, top side of the part of the snowmobile.
Figure 15:
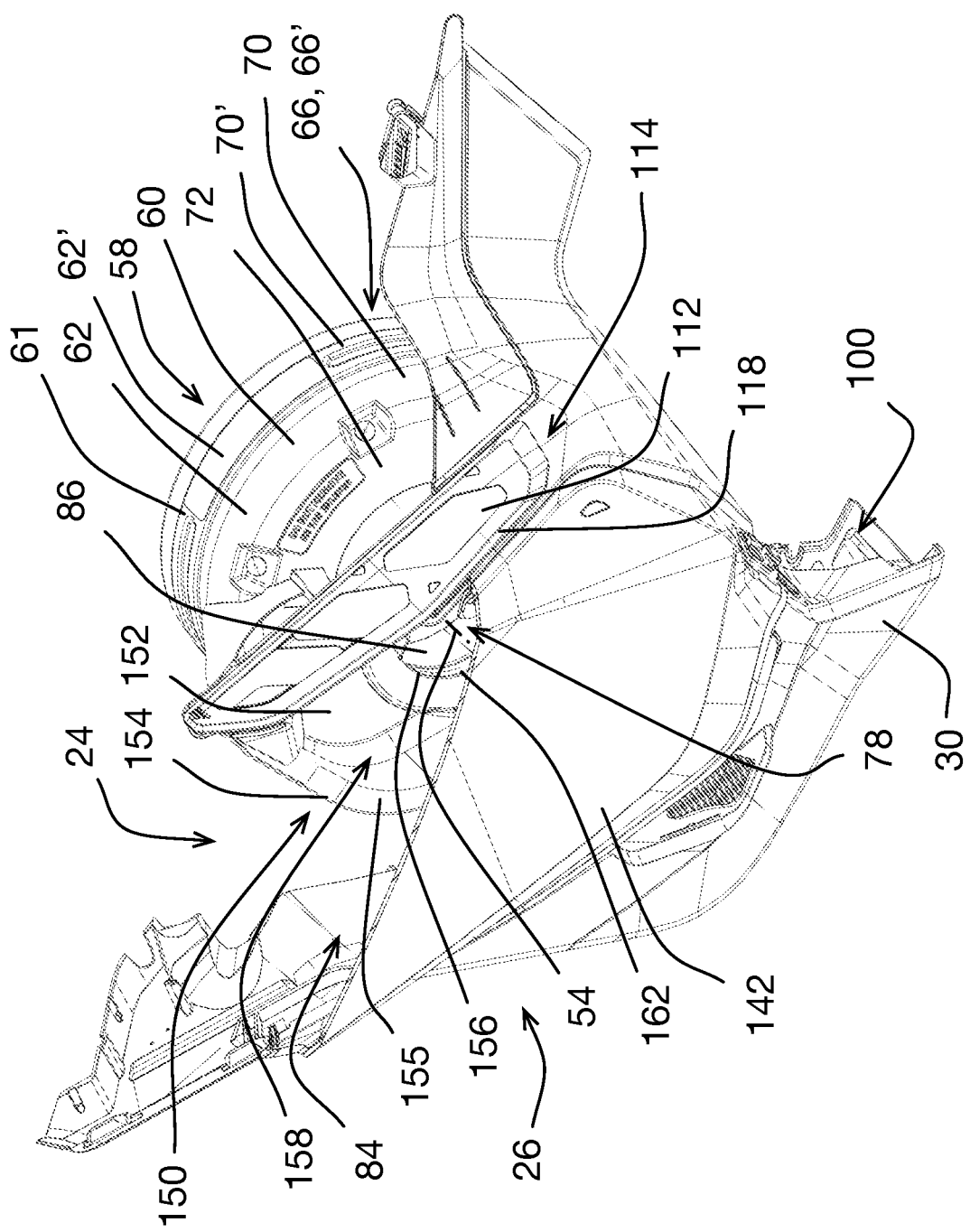
FIG. 15 is a perspective view taken from a rear, left, top side of some components of the snowmobile of FIG. 12, with the cowlings of the snowmobile being in part cut away to show some parts of the components.
Figure 16:
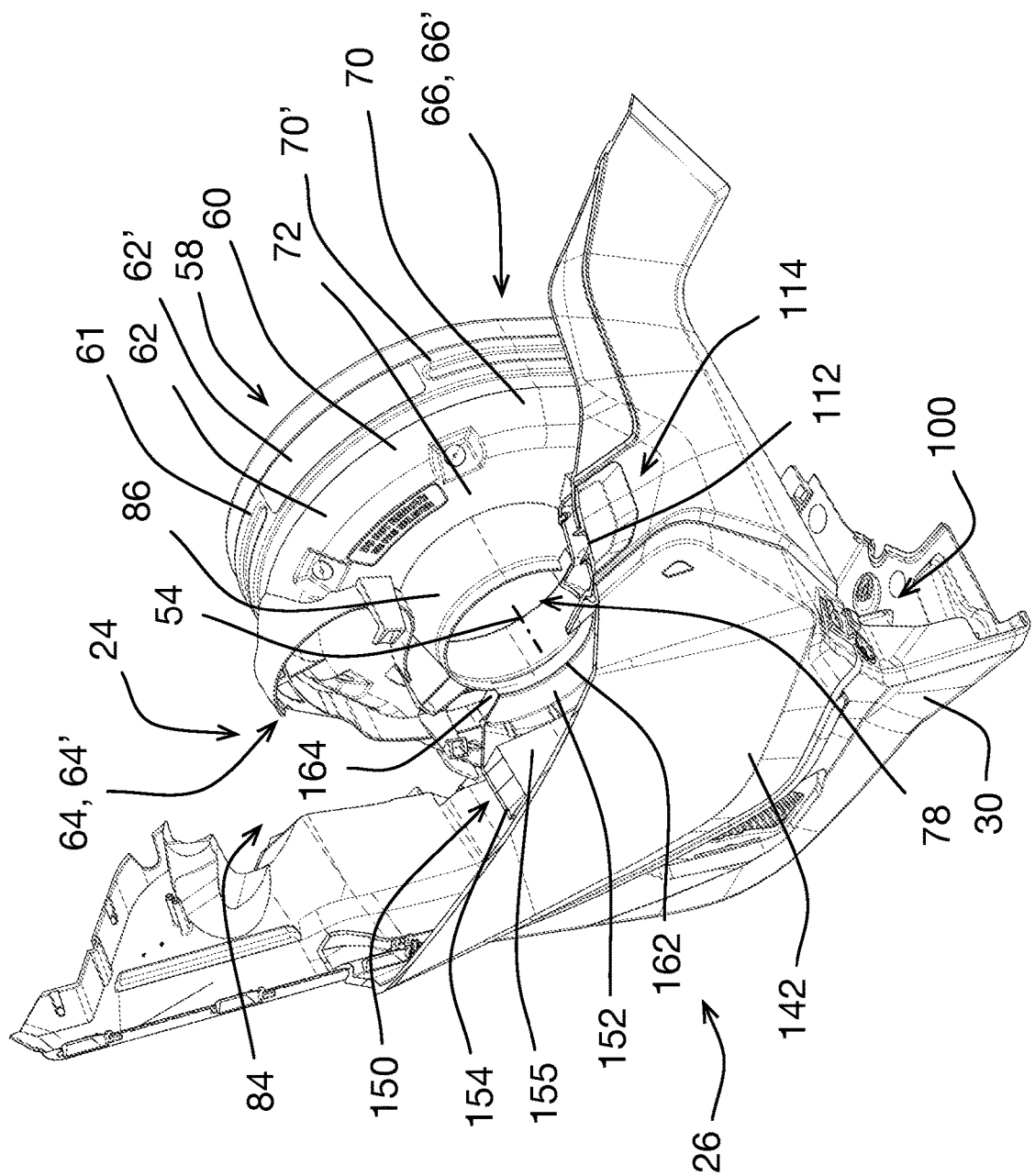
FIG. 16 is a perspective view taken from a rear, left, top side of some components of the snowmobile of FIG. 12, with the cowlings, the air funnel, and the air inlet cover of the snowmobile being in part cut away to show some parts of the components.

Now referring to FIG. 14, a seal 164 made of foam is attached to an outer surface of the right side wall 152 with a suitable adhesive. The seal 164 is disposed circumferentially around the air outlet 162 of the air funnel 150. Now also referring to FIGS. 15 and 16, when the left side panel 142 is closed, the air funnel 150 is positioned between the left side panel 142 and the pulley guard assembly 58; and the air outlet 162 of the air funnel 150 is positioned proximate the distal end of the flange 86 of the air inlet 78 of the pulley guard assembly 58. The air outlet 162 supplies ambient air to the air inlet 78 of the pulley guard assembly 58.

In the closed position 144 of the left side panel 142, the seal 164 of the air funnel 150 is compressed by the right side wall 152 against the distal end of the flange 86 of the pulley guard assembly 58. The seal 164 thereby helps reduce or prevents passage of air from the engine compartment 24 into the air inlet 78. It is contemplated that the seal 164 need not be compressed.

The seal 164 is not connected to the flange 86. Therefore, and as shown in FIG. 12, when the left side panel 142 is pivoted to its open position 146, the air funnel 150 moves with the left side panel 142, away from the pulley guard assembly 58. It is contemplated that in some implementations, the seal 164 could be attached to the flange 86 of the air inlet 78 of the pulley guard assembly 58 instead of being attached to the right side wall 152 of the air funnel 150. In such embodiments, the seal 164 would stay on the flange 86 when the left side panel 142 is pivoted to its open position 146. It is contemplated that the seal 164 could be made of any other suitable materials and using any suitable manufacturing methods. It is contemplated that a different seal could be used. It is also contemplated that the seal 164 could be omitted, in which case the air outlet 162 could be, for example, sufficiently close to the flange 86 to reduce and/or eliminate passage of air into the air inlet 78 from the engine compartment 24 and/or from the space 84.

It is also contemplated that in some implementations, the air funnel 150 could be attached to the flange 86 instead of being attached to the left side panel 142. In such implementations, the air funnel 150 would stay with the pulley guard assembly 58 when the left side panel 142 is pivoted to its open position 146. In some such implementations, a seal made of foam or other suitable material could be attached along the left side outer contour 156 of the curved front wall 154 of the air funnel 150. In some such embodiments, the seal would be compressed by the inner side of the left side panel 142 when the left side panel 142 is in its closed position 144 and would help reduce or prevent passage of air from the engine compartment 24 into the air inlet 78.

In the implementation shown in FIGS. 12 to 16, when the snowmobile 140 is in use, the air duct 158 delivers ambient air from outside of the snowmobile 140 to the air inlet 78 of the pulley guard assembly 58, without first introducing this ambient air into the engine compartment 24 or the space 84 in the engine compartment 24 of the snowmobile 140. Air in the engine compartment 24 is generally warmer than ambient air. Therefore, the direct air connection provided by the air duct 158 from outside of the snowmobile 140 to the air inlet 78 of the pulley guard assembly 58, delivers relatively cooler air to the pulley guard assembly 58 via the air inlet 78 of the pulley guard assembly 58 in some operating conditions of the snowmobile 140, in comparison with implementations in which in similar operating conditions air enters the air inlet 78 of the pulley guard assembly 58 from the engine compartment 24.

Some non-limiting implementations of the present technology can be represented as presented in the following numbered clauses:

CLAUSE 1. A snowmobile, comprising: a frame, the frame including a tunnel; a seat disposed on the tunnel; an endless track disposed at least in part under the tunnel; at least one ski operatively connected to the frame; a handlebar operatively connected to the at least one ski; a cowling connected to the frame, the cowling being disposed at least in part forward of the seat, the cowling defining at least in part an engine compartment and a cowling air inlet; an engine disposed at least in part in the engine compartment and being connected to the frame; a continuously variable transmission (CVT) operatively connecting the engine to the endless track, the CVT being disposed at least in part in the engine compartment, the CVT being disposed laterally between the engine and a lateral side of the cowling, the CVT comprising: a primary pulley operatively connected to the engine, the primary pulley being driven by the engine about a primary pulley axis, a secondary pulley operatively connecting the primary pulley to the endless track, the secondary pulley being driven by the primary pulley about a secondary pulley axis, the secondary pulley axis being parallel to the primary pulley axis, and an endless flexible member operatively connecting the primary pulley to the secondary pulley; a pulley guard assembly disposed over at least a portion of the CVT, the pulley guard assembly being disposed at least in part laterally between the CVT and the lateral side of the cowling, the pulley guard assembly defining a pulley guard assembly air inlet; and an air duct fluidly connecting the cowling air inlet to the pulley guard assembly air inlet.

CLAUSE 2. The snowmobile of CLAUSE 1, wherein: the air duct has a first end attached to the cowling at the cowling air inlet to receive an airflow via the cowling air inlet; and a second end positioned proximate the pulley guard assembly air inlet to supply the airflow to the pulley guard assembly air inlet.

CLAUSE 3. The snowmobile of CLAUSE 2, wherein a seal is positioned between the second end of the air duct and the pulley guard assembly, the seal circumscribing the pulley guard assembly air inlet.

CLAUSE 4. The snowmobile of CLAUSE 3, wherein the seal is a foam seal that is attached to the pulley guard assembly and lacks attachment to the second end of the air duct.

CLAUSE 5. The snowmobile of any one of CLAUSES 1 to 4, wherein the pulley guard assembly defines a pulley guard assembly air outlet, the pulley guard assembly air outlet fluidly communicating with the pulley guard assembly air inlet via an airflow path defined through the pulley guard assembly.

CLAUSE 6. The snowmobile of CLAUSE 5, wherein the pulley guard assembly defines the pulley guard assembly air outlet in a bottom of the pulley guard assembly.

CLAUSE 7. The snowmobile of any one of CLAUSES 1 to 6, wherein: a space is defined at least in part laterally between the pulley guard assembly and the lateral side of the cowling; and the cowling defines a cowling air outlet, the cowling air outlet fluidly communicating with the space.

CLAUSE 8. The snowmobile of CLAUSES 7, further comprising: a left side footrest connected to a left side of the tunnel and a right side footrest connected to a right side of the tunnel; and wherein the cowling air outlet directs air from the space toward one of the left side footrest and the right side footrest.

CLAUSE 9. The snowmobile of CLAUSES 8, wherein the cowling air outlet is disposed in front of the one of the left side footrest and the right side footrest.

CLAUSE 10. The snowmobile of any one of CLAUSES 1 to 9, wherein the primary pulley includes a first plurality of fins.

CLAUSE 11. The snowmobile of any one of CLAUSES 1 to 10, wherein the secondary pulley includes a second plurality of fins.

CLAUSE 12. The snowmobile of any one of CLAUSES 1 to 11, wherein: the cowling includes a hood, a left side panel, a right side panel, and a bottom pan; and the hood, the left side panel, the right side panel, and the bottom pan define at least in part the engine compartment.

CLAUSE 13. The snowmobile of CLAUSE 12, wherein: the cowling air inlet is defined in one of the left side panel and the right side panel; and the one of the left side panel and the right side panel is pivotable between, a closed position in which the second end of the air duct is positioned proximate the pulley guard assembly air inlet, and an open position in which the second end of the air duct is spaced from the pulley guard assembly air inlet to provide service access to the pulley guard assembly air inlet.

CLAUSE 14. The snowmobile of any one of CLAUSES 1 to 13, wherein the pulley guard assembly is disposed over at least part of the secondary pulley and at least part of the endless flexible member.

CLAUSE 15. The snowmobile of any one of CLAUSES 1 to 14, wherein the pulley guard assembly air inlet faces toward the lateral side of the cowling.

CLAUSE 16. The snowmobile of any one of CLAUSES 1 to 15, wherein the pulley guard assembly air inlet is coaxial with the secondary pulley axis.

CLAUSE 17. The snowmobile of any one of CLAUSES 1 to 16, wherein the secondary pulley axis passes through the pulley guard assembly air inlet.

CLAUSE 18. The snowmobile of any one of CLAUSES 1 to 17, wherein: the pulley guard assembly air inlet has a shape that is one of circular and elliptical, the shape having a center; and the secondary pulley axis passes through the center of the pulley guard assembly air inlet.

CLAUSE 19. A pulley guard assembly for a continuously variable transmission (CVT), the pulley guard assembly comprising: an arcuate top wall having a front end and a rear end; a front wall extending downward from the front end of the arcuate top wall; a rear wall extending downward from the rear end of the arcuate top wall; and a side wall connected to one side of the arcuate top wall, the front wall and the rear wall, the side wall defining an air inlet; the pulley guard assembly being open on a side thereof opposite the side wall and being open at a bottom thereof.

CLAUSE 20. The pulley guard assembly of CLAUSE 19, wherein the front wall extends downward and forward from the front end of the arcuate top wall.

CLAUSE 21. The pulley guard assembly of CLAUSE 19 or 20, wherein the rear wall extends downward and forward from the rear end of the arcuate top wall.

CLAUSE 22. The pulley guard assembly of any one of CLAUSES 19 to 21, wherein the front wall and the rear wall diverge from each other as they extend downward from the arcuate top wall.

CLAUSE 23. The pulley guard assembly of any one of CLAUSES 19 to 22, wherein an axis of curvature of the top wall passes through a center of the air inlet.

CLAUSE 24. The pulley guard assembly of any one of CLAUSES 19 to 23, further comprising a flange connected to the side wall about the air inlet, the side wall being disposed laterally between the flange and the top, front and rear walls.

CLAUSE 25. The pulley guard assembly of any one of CLAUSES 19 to 23, further comprising a seal connected to a surface of the side wall, the surface being opposite the arcuate top wall, the front wall and the rear wall, the seal circumscribing the air inlet.

CLAUSE 26. The pulley guard assembly of CLAUSE 24, further comprising a seal connected to a free end of the flange, the seal circumscribing the air inlet.

CLAUSE 27. The pulley guard assembly of CLAUSE 25 or 26, wherein the seal is a foam seal.

CLAUSE 28. A snowmobile, comprising: a frame, the frame including a tunnel; a seat disposed on the tunnel; an endless track disposed at least in part under the tunnel; at least one ski operatively connected to the frame; a handlebar operatively connected to the at least one ski; a cowling connected to the frame, the cowling being disposed at least in part forward of the seat, the cowling defining at least in part an engine compartment; an engine disposed at least in part in the engine compartment and being connected to the frame; a continuously variable transmission (CVT) operatively connecting the engine to the endless track, the CVT being disposed at least in part in the engine compartment, the CVT being disposed laterally between the engine and a lateral side of the cowling, the CVT comprising: a primary pulley operatively connected to the engine, the primary pulley being driven by the engine about a primary pulley axis, a secondary pulley operatively connecting the primary pulley to the endless track, the secondary pulley being driven by the primary pulley about a secondary pulley axis, the secondary pulley axis being parallel to the primary pulley axis, and an endless flexible member operatively connecting the primary pulley to the secondary pulley; and a pulley guard assembly disposed over at least a portion of the CVT, the pulley guard assembly being disposed at least in part laterally between the CVT and the lateral side of the cowling, the pulley guard assembly defining a pulley guard assembly air inlet, the pulley guard assembly air inlet fluidly communicating with a space defined at least in part laterally between the pulley guard assembly and the lateral side of the cowling.

CLAUSE 29. The snowmobile of CLAUSE 28, wherein a cowling air inlet is defined in the cowling, the cowling air inlet fluidly communicating with the space.

CLAUSE 30. The snowmobile of CLAUSES 28 or 29, wherein the pulley guard assembly defines a pulley guard assembly air outlet, the pulley guard assembly air outlet fluidly communicating with the pulley guard assembly air inlet via an airflow path defined through the pulley guard assembly.

CLAUSE 31. The snowmobile of any one of CLAUSES 28 to 30, wherein the cowling defines a cowling air outlet, the cowling air outlet fluidly communicating with the space.

CLAUSE 32. The snowmobile of CLAUSE 31, wherein the cowling air outlet is defined in a lower end of the cowling.

CLAUSE 33. The snowmobile of CLAUSE 31 or 32, further comprising a left side footrest connected to a left side of the tunnel and a right side footrest connected to a right side of the tunnel, and wherein the cowling air outlet directs air from the space toward one of the left side footrest and the right side footrest.

CLAUSE 34. The snowmobile of CLAUSE 33, wherein the cowling air outlet is disposed in front of the one of the left side footrest and the right side footrest.

CLAUSE 35. The snowmobile of any one of CLAUSES 28 to 34, wherein the primary pulley includes a first plurality of fins.

CLAUSE 36. The snowmobile of any one of CLAUSES 28 to 35, wherein the secondary pulley includes a second plurality of fins.

CLAUSE 37. The snowmobile of any one of CLAUSES 28 to 36, wherein: the cowling includes a hood, a left side panel, a right side panel, and a bottom pan; and the hood, the left side panel, the right side panel, and the bottom pan define at least in part the engine compartment.

CLAUSE 38. The snowmobile of any one of CLAUSES 28 to 37, wherein the pulley guard assembly is disposed over at least part of the secondary pulley and at least part of the endless flexible member.

CLAUSE 39. The snowmobile of any one of CLAUSES 28 to 38, wherein the pulley guard assembly air inlet faces toward the lateral side of the cowling.

CLAUSE 40. The snowmobile of any one of CLAUSES 28 to 39, wherein the pulley guard assembly air inlet is coaxial with the secondary pulley axis.

CLAUSE 41. The snowmobile of CLAUSE 28, wherein: a cowling air inlet and a cowling air outlet are defined in the cowling, the cowling air inlet and the cowling air outlet fluidly communicating with the space; and the pulley guard assembly defines a pulley guard assembly air outlet, the pulley guard assembly air outlet fluidly communicating with the pulley guard assembly air inlet via an airflow path defined through the pulley guard assembly.

Modifications and improvements to the above-described implementations of the present technology may become apparent to those skilled in the art. The foregoing description is intended to be exemplary rather than limiting.

The invention claimed is:

1. A snowmobile, comprising:
   a frame, the frame including a tunnel;
   a seat disposed on the tunnel;
   an endless track disposed at least in part under the tunnel;
   at least one ski operatively connected to the frame;
   a handlebar operatively connected to the at least one ski;
   a cowling connected to the frame, the cowling being disposed at least in part forward of the seat, the cowling defining at least in part an engine compartment and a cowling air inlet;
   an engine disposed at least in part in the engine compartment and being connected to the frame;
   a continuously variable transmission (CVT) operatively connecting the engine to the endless track, the CVT being disposed at least in part in the engine compartment, the CVT being disposed laterally between the engine and a lateral side of the cowling, the CVT comprising:
      a primary pulley operatively connected to the engine, the primary pulley being driven by the engine about a primary pulley axis,
      a secondary pulley operatively connecting the primary pulley to the endless track, the secondary pulley being driven by the primary pulley about a secondary pulley axis, the secondary pulley axis being parallel to the primary pulley axis, and
      an endless flexible member operatively connecting the primary pulley to the secondary pulley;
   a pulley guard assembly disposed over at least a portion of the CVT, the pulley guard assembly being disposed at least in part laterally between the CVT and the lateral side of the cowling, the pulley guard assembly defining a pulley guard assembly air inlet; and
   an air duct fluidly connecting the cowling air inlet to the pulley guard assembly air inlet.

2. The snowmobile of claim 1, wherein the air duct has:
   a first end attached to the cowling at the cowling air inlet to receive an airflow via the cowling air inlet; and
   a second end positioned proximate the pulley guard assembly air inlet to supply the airflow to the pulley guard assembly air inlet.

3. The snowmobile of claim 2, wherein a seal is positioned between the second end of the air duct and the pulley guard assembly, the seal circumscribing the pulley guard assembly air inlet.

4. The snowmobile of claim 3, wherein the seal is a foam seal that is attached to the pulley guard assembly and lacks attachment to the second end of the air duct.

5. The snowmobile of claim 1, wherein the pulley guard assembly defines a pulley guard assembly air outlet, the pulley guard assembly air outlet fluidly communicating with the pulley guard assembly air inlet via an airflow path defined through the pulley guard assembly.

6. The snowmobile of claim 5, wherein the pulley guard assembly defines the pulley guard assembly air outlet in a bottom of the pulley guard assembly.

7. The snowmobile of claim 1, wherein:
   a space is defined at least in part laterally between the pulley guard assembly and the lateral side of the cowling; and
   the cowling defines a cowling air outlet, the cowling air outlet fluidly communicating with the space.

8. The snowmobile of claim 7, further comprising:
   a left side footrest connected to a left side of the tunnel and a right side footrest connected to a right side of the tunnel;
   wherein the cowling air outlet directs air from the space toward one of the left side footrest and the right side footrest.

9. The snowmobile of claim 8, wherein the cowling air outlet is disposed in front of the one of the left side footrest and the right side footrest.

10. The snowmobile of claim 1, wherein the primary pulley includes a first plurality of fins.

11. The snowmobile of claim 1, wherein the secondary pulley includes a second plurality of fins.

12. The snowmobile of claim 1, wherein:
    the cowling includes a hood, a left side panel, a right side panel, and a bottom pan; and
    the hood, the left side panel, the right side panel, and the bottom pan define at least in part the engine compartment.

13. The snowmobile of claim 12, wherein:
    the cowling air inlet is defined in one of the left side panel and the right side panel;
    the air duct has a first end and a second end, the first end being attached to the cowling at the cowling air inlet to receive an airflow via the cowling air inlet; and
    the one of the left side panel and the right side panel is pivotable between,
       a closed position in which the second end of the air duct is positioned proximate the pulley guard assembly air inlet, and
       an open position in which the second end of the air duct is spaced from the pulley guard assembly air inlet to provide service access to the pulley guard assembly air inlet.

14. The snowmobile of claim 1, wherein the pulley guard assembly is disposed over at least part of the secondary pulley and at least part of the endless flexible member.

15. The snowmobile of claim 1, wherein the pulley guard assembly air inlet faces toward the lateral side of the cowling.

16. The snowmobile of claim 1, wherein the pulley guard assembly air inlet is coaxial with the secondary pulley axis.

17. The snowmobile of claim 1, wherein the secondary pulley axis passes through the pulley guard assembly air inlet.

18. The snowmobile of claim 1, wherein:
    the pulley guard assembly air inlet has a shape that is one of circular and elliptical, the shape having a center; and
    the secondary pulley axis passes through the center of the pulley guard assembly air inlet.

* * * * *